AUTOMATIC INTERRUPT SYSTEM FOR A DATA PROCESSOR

Filed Nov. 30, 1962 14 Sheets-Sheet 1

INVENTORS.
BLAIR C. THOMPSON
CORNELIUS C. PERKINS
JOSEPH SHIFMAN
STANLEY J. PEZELY

Nov. 15, 1966 B. C. THOMPSON ETAL 3,286,239

AUTOMATIC INTERRUPT SYSTEM FOR A DATA PROCESSOR

Filed Nov. 30, 1962 14 Sheets-Sheet 2

INVENTORS.
BLAIR C. THOMPSON
CORNELIUS C. PERKINS
JOSEPH SHIFMAN
STANLEY J. PEZELY

*INVENTORS.*
BLAIR C. THOMPSON
CORNELIUS C. PERKINS
JOSEPH SHIFMAN
STANLEY J. PEZELY

INVENTORS.
BLAIR C. THOMPSON
CORNELIUS C. PERKINS
JOSEPH SHIFMAN
STANLEY J. PEZELY

INVENTORS.
BLAIR C. THOMPSON
CORNELIUS C. PERKINS
JOSEPH SHIFMAN
STANLEY J. PEZELY

INVENTORS
BLAIR C. THOMPSON
CORNELIUS C. PERKINS
JOSEPH SHIFMAN
STANLEY J. PEZELY

INVENTORS.
BLAIR C. THOMPSON
CORNELIUS C. PERKINS
JOSEPH SHIFMAN
STANLEY J. PEZELY

INVENTORS.
BLAIR C. THOMPSON
CORNELIUS C. PERKINS
JOSEPH SHIFMAN
STANLEY J. PEZELY

*INVENTORS*
BLAIR C. THOMPSON
CORNELIUS C. PERKINS
JOSEPH SHIFMAN
STANLEY J. PEZELY

INVENTORS.
BLAIR C. THOMPSON
CORNELIUS C. PERKINS
JOSEPH SHIFMAN
STANLEY J. PEZELY

INVENTORS.
BLAIR C. THOMPSON
CORNELIUS C. PERKINS
JOSEPH SHIFMAN
STANLEY J. PEZELY

INVENTORS.
BLAIR C. THOMPSON
CORNELIUS C. PERKINS
JOSEPH SHIFMAN
STANLEY J. PEZELY

AUTOMATIC INTERRUPT SYSTEM FOR A DATA PROCESSOR

Filed Nov. 30, 1962 14 Sheets-Sheet 13

INVENTORS.
BLAIR C. THOMPSON
CORNELIUS C. PERKINS
JOSEPH SHIFMAN
STANLEY J. PEZELY

AUTOMATIC INTERRUPT SYSTEM FOR A DATA PROCESSOR

Filed Nov. 30, 1962

INVENTORS.
BLAIR C. THOMPSON
CORNELIUS C. PERKINS
JOSEPH SHIFMAN
STANLEY J. PEZELY

United States Patent Office 3,286,239
Patented Nov. 15, 1966

3,286,239

AUTOMATIC INTERRUPT SYSTEM FOR A DATA PROCESSOR

Blair C. Thompson, King of Prussia, Pa., Cornelius C. Perkins, Birmingham, Mich., and Joseph Shifman, Villanova, and Stanley J. Pezely, Norristown, Pa., assignors to Burroughs Corporation, a corporation of Michigan Filed Nov. 30, 1962, Ser. No. 241,225
10 Claims. (Cl. 340—172.5)

This invention relates to an automatic interrupt system for a data processor, and more particularly, it relates to an automatic interrupting system in which interruption means are associated with normal processing steps as well as with error recovery and the interrupts cause processing operational shifts in a multi-moded computer processor rather than a suspension or interruption in processing.

In the past, automatic interrupting schemes for data processors were usually associated with means for halting processing of the central processor of the system while an error or fault which had occurred could be remedied. These schemes had, as their prime purpose, the task of insuring the central processor against the performance of useless work. More sophisticated schemes merely included additional interruptions to cover a greater number of these errors or faults. Some earlier interrupt systems provided means, using certain remedial program steps, to allow the computer system to seek and possibly indicate or overlook the source of the interruption. However, all of these earlier systems had a common disadvantage. This was the system's inability to follow any remedial program path other than the one originally specified. If this fixed remedy was inadequate to enable the processor to return to normal processing, the processing halt would last until computer personnel were able to physically repair the fault.

The present invention uses the word interrupt in a different sense. It does not imply that the work of the computer processor is interrupted or halted in any way. Rather that a transfer of control is taking place in which a portion of an executive or control program is about to be initiated and executed. At the conclusion of the execution of this control operation there is a return transfer of the computer processor to the execution of the normal processing program. When the computer processor is executing the control program, it is said to be operating in its Control Mode. During execution of the normal program it is said to be in the Normal Mode. The interruptions of the present scheme are also expanded to include many areas not normally included in past systems. In fact, there is included an entirely new class of interruptions which are in no way associated with errors or their recovery. This new class is associated entirely with normal data processing operations.

The present invention therefore includes all of the features covered by past automatic interruption schemes, and, in addition, introduces an entirely novel concept in which interruption of processing occurs for a variety of reasons other than just faults occurring within the system.

It is, therefore, a prime object of this invention to provide an automatic interruption system for a data processor in which the interruption does not halt operation of the central processor, but rather transfers its processing capabilities from a first to a second operational mode.

It is a further object of this invention to provide an automatic interruption system for a data processor in which the interruptions are associated with normal operations in which no error has occurred.

It is a further object of this invention to provide an automatic interruption system for a data processor in which an interrupt may be stored along with a number of other interruptions and checked by a central processor prior to being accepted by a central processor for execution.

It is a further object of this invention to provide an automatic interruption system for a data processor in which an interruption associated with error recovery causes a series of control routines to be executed which decides the source of the error and initiates corrective steps to overcome the problem.

It is a further object of this invention to provide an automatic interruption system for a data processor in which an automatic interruption associated with the loss of primary power initiates and directs a series of steps to be taken prior to system shutdown allowing sufficient time for remanent storage of all present pertinent information to enable later resumption of the program by the processor without loss of information.

It is a further object of this invention to provide an automatic interruption system for a data processor in which an automatic interruption associated with the resumption of primary power initiates the restarting of the system and resumption of the program when primary power has been restored.

It is a further object of this invention to provide an automatic interruption system for a data processor in which an interruption associated with the completion of an Input/Output Operation of a Data Processing System causes the computer processor to change from normal operational mode to control operational mode and initiate a new Input/Output operation if necessary.

It is a further object of this invention to provide an automatic interruption system for a data processor in which an interruption is created either internally to, or externally of a computer processor, the external interruptions being created by a peripheral device of the Data Processing System, which desires to receive or transmit information.

It is a further object of this invention to provide an automatic interruption system for a data processor in which an interruption may be masked or blocked from receipt and execution by the central processor.

It is a further object of this invention to provide an automatic interruption system for a data processor in which the same interrupt is sent to all processors within a system having a plurality of processors, and the only processor capable of processing interruption is selected by an executive program.

It is a further object of this invention to provide an automatic interruption system for a data processor in which each error recovery interruption is associated with an extensive remedial program contained in an executive or control program.

Various other objects and advantages will appear in the following description of one embodiment and the novel features will be particularly pointed out hereinafter in connection with the accompanying drawings and the appended claims.

Briefly, the automatic interrupt system provided herein is a comprehensive and sophisticated interrupt system whose function is principally that of causing an operational mode shift in the computer processor, enabling an executive or control program to handle in a timely fashion, conditions arising which are not only associated with error recovery but with the normal operation of a data processing system as well.

It is a built-in electronic facility by which the entire processing system complement can signal the executive or control program that some element of the system is not operating properly or that control of some type is needed.

It recognizes program and hardware generated interrupt conditions caused by such situations arising in the execution of the program. It acknowledges manually initiated requests and automatic external requests for communication with the computer system. It also recognizes equipment faults such as parity errors, illegal operations and primary power failures.

The executive or control program of the data processing system depends heavily upon the comprehensive set of interrupts incorporated in the present invention. All interrupt conditions are transmitted to all processing computer elements of the system and each computer element can respond to all of the interrupt conditions noted herein.

However, to make it possible to distribute responsibility for various interrupt conditions, both system and local, each computer module has an interrupt mask register that controls the setting of individual bits of an interrupt register. The occurrence of any interrupt causes one of the system computer elements to leave the program it has been running and branch to a suitable executive or control routine entry, entering the control mode as it branches. The control mode differs from the normal mode operation in that it blocks out the response to some low priority interrupts (although it does record them), and enables the execution of some additional instructions reserved for use by the executive or control program. An example of such use would be the setting of the interrupt mask or memory protection registers, or the transmitting an input/output instruction to an input/output control device.

In responding to an interrupt, the executive or control program transfers control to the appropriate routine handling the condition designated by the interrupt. When the interrupt condition has been satisfied, control is returned to the original object program. Interrupts are caused by both normal operating conditions and by related abnormalities of the program for the physical equipment. The interrupts caused by normal operating conditions include: (1) sixteen different types of external requests, (2) completion of an input/output peripheral device operation, (3) real-time clock overflow, (4) computer-to-computer interrupts, (5) control mode entry (normal mode halt).

Interrupts related to abnormalities of either the program or the equipment include: (1) attempt by the program to write out-of-bounds, (2) arithmetic overflow, (3) illegal instruction, (4) inability to access memory or an internal parity error. Parity error on an input/output operation causes termination of that operation with a suitable indication to the control program, (5) a primary power failure, (6) automatic restart after primary power failure, (7) an input/output operation termination other than normal completion. While the reason for the inclusion of most of the interrupts noted above are evident, a word of comment about some of them is in order.

The primary power failure interrupt is the interrupt having the highest priority in the present concept. It is always pre-emptive. This interrupt causes all computer and input/output control devices to terminate operations and to store all volatile information either in the main memory or in the high speed thin-film registers of the auxiliary high speed memory. This interrupt protects the system from loss of information from a transient power failure and is initiated when the primary power source voltage drops below a predetermined limit.

The automatic restart after primary power failure interrupt is provided so that the previous state of the system can be reconstructed.

A description of how an external interrupt is handled might tend to clarify the general interrupt procedure as described herein. Upon the presence of an external interrupt, the computer which has been assigned responsibility to handle such interrupts automatically stores the contents of those registers whose contents are necessary to subsequently reconstitute its state. It then enters the control mode and goes to a standard location as determined by the hardware of the system, where a branch to the external request routine is located. This routine has the responsibility of determining which external request line requires servicing, and after consulting a list of all of the external devices that are associated with the external interrupt lines, the computer constructs and transmits an input instruction to the request device for an initial message. The computer then makes an entry into the input/output completion program to activate the appropriate responding routine when the message is read in. A check is then made for the occurrence of an additional external request. And finally, the computer restores the saved register contents and returns in normal mode to the interrupted program. It is difficult to describe separately the acts of the present automatic interrupt system without continued reference to the use of an executive or control program. The control program in the present instance is a logical grouping of program routines designed to respond to the comprehensive interrupt system being presently disclosed. By monitoring the interrupt system, the control program will give instantaneous response to change the environment both of hardware and of programs.

Functionally, the control program may be seen as a collection of subroutines designed to perform specific functions. The various interrupts that may occur in the system are first recognized by the executive portion of the control program. The executive portion identifies the particular interrupt, decides what is to be done as a result of this interrupt condition, and calls one or more of the subroutines of the control program to respond to this particular condition.

The control program is logically divided between normal program operation and error recovery. This division appears to be a natural one in that five of the presently included interrupts all occur during normal system operation as a result of the operating programs and the system environment. As has been noted, these normal interrupts are: (1) external requests, (2) interrupt computer, (3) real-time clock overflow, (4) input/output operation completion, and (5) halt.

The remainder of the interrupt conditions occur infrequently and provide information of hardware malfunction or program error. The sensing of the error conditions by the control program initiates responses such as diagnostic or dump routines to aid in correcting these hardware/program errors. As has been previously stated, the control program is written as a collection of individual routines that are called on by the executive portion of the control program. However, one call by the executive portion of a particular routine may generate a chain of calls through the various packages of the control program itself, since many of the routines are interdependent and a call on one initiates a chain of calls on the other.

Associated with the interrupt conditions relating to hardware malfunction or program error are a group of test and diagnostic programs. A confidence routine may be performed during each computation cycle. The routine will verify the proper operation of all system elements. The control program responding to real-time clock interrupts will manage the regular execution of this routine. Failure to perform the confidence routine successfully will be reported to the operator through peripheral device of the console supervisory printer variety and under the control program a set of diagnostic procedures will be initiated.

The system diagnostic check out routine performed in real-time will be an integrated series of routines for thoroughly probing the operation of system elements including the computer, memory, input/output control devices, and the peripheral devices. The routines will investigate element performance at length and isolate the faults to a device level. When a device is determined out of condition for system use, the control program will automatically delete the offending module from the operating system and reassign all its functions to other similar devices, providing uninterrupted system operation. If necessary, lowest priority programs will be discontinued. Device diagnostic procedures are provided for correctional maintainence of a malfunctioning device. The device diagnostic procedures enable maintenance personnel to identify the defective subassembly within the device. After the defective subassembly has been replaced the module diagnostic procedures performed to verify proper device operation, the control program is advised of the availability of the repaired module by means of a manual C-board entry, by an operator. The control program will then automatically replace the repaired device into the operating system.

An unusual capability for recovery from failure was a prime requisite among those factors which influenced the present system design. The interrupt system as associated with the control program gives an unprecedented resistance to incapacitation due to hardware failure.

The control program has been mentioned previously as an implementation of the interrupt system. It plays an important part in the recovery from failure capability. Some of the facilities for recovering from failure are provided in a standard control program. However, individually tailored parts for particular uses also help implement a desired pattern of reaction to hardware malfunction.

Detection of failure is an important function of the interrupt system. An interrupt occurs when an improper parity is sensed, when overflow occurs, when an illegal instruction code is encountered, when a portion of the memory denies the computer access to its contents, when primary power goes out of tolerance, or when an attempt is made to store in an area of memory outside of those address boundaries recorded in the executing computers memory limit registers. Whenever any of these errors occur, the interrupt action consists of a transfer of control to one of the routines of the control program designated to service that class of interrupt.

Such a routine is called a responder-routine and each class of interrupt has such a responder routine. It works basically as follows: (1) tests where this job has anticipated this interrupt and has provided error remedial procedure, (2) performs rudimentary double checks, (3) performs operations to vindicate all but one element or device so that vindicated elements or devices may be returned to useful service, (4) disqualifies the unvindicated elements or devices from participation in duty activities until a suitable investigation has been made, and (5) dispatches appropriate messages to the on-line status of message output device.

The real-time clocks in the present system are made to generate interrupts periodically for the purposes of accomplishing periodic information saving actions. The time clock overflow interrupt responder routine of the control program is written to accept specifications from programs regarding the desired frequency of dumping and the scope of material that is to be saved.

The invention however, both as to its organization and method of operation together with further objects and advantages thereof may best be understood by reference to the following description taken in connection with the drawings wherein:

FIG. 1 comprises FIGS. 1A and 1B together presenting a block diagram showing the overall system of interrupts in association with the data processing system elements to which they relate;

Figure 4A:
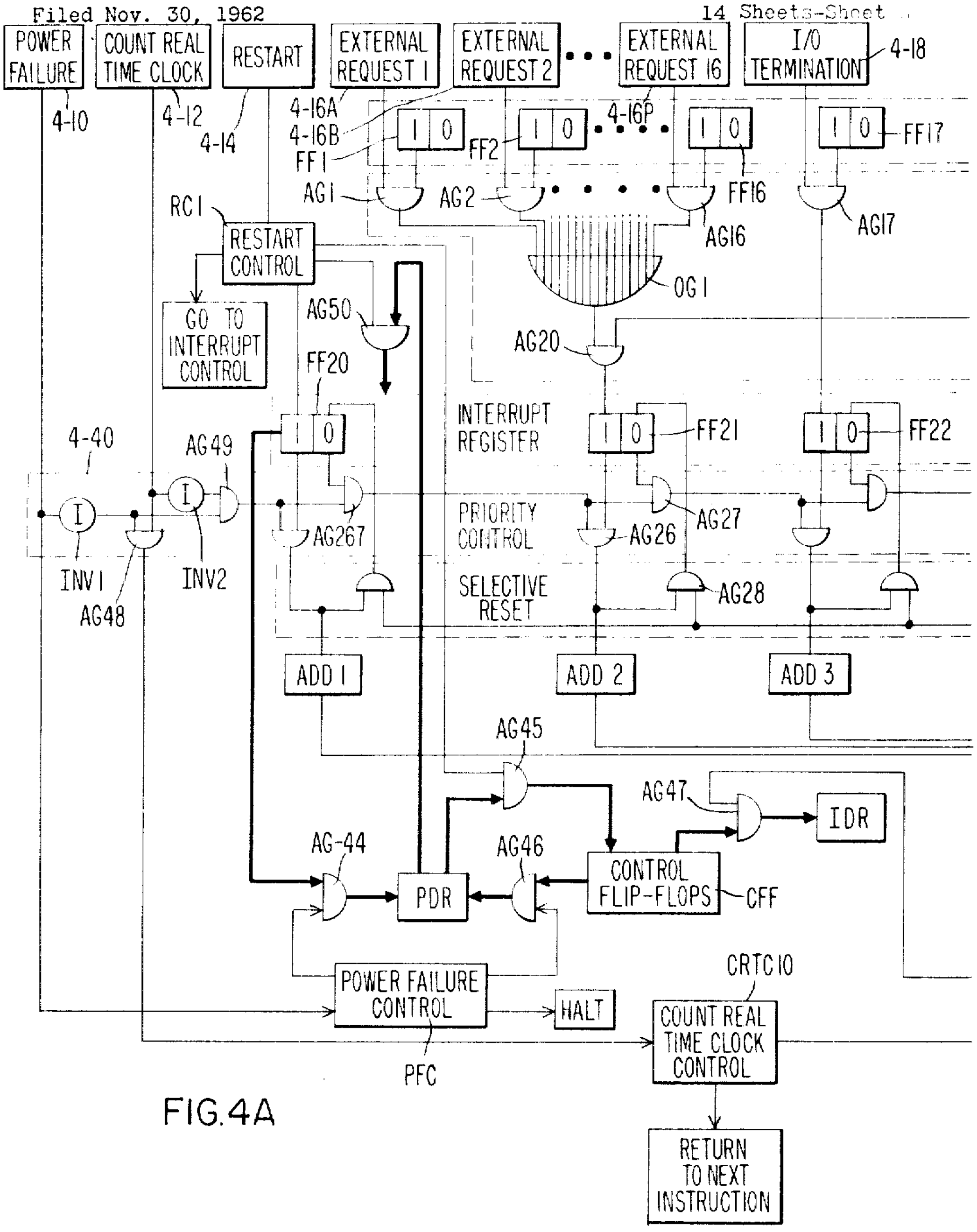
Figure 4:
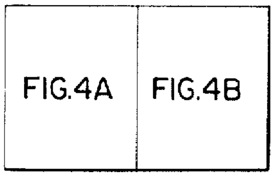
Figure 4B:
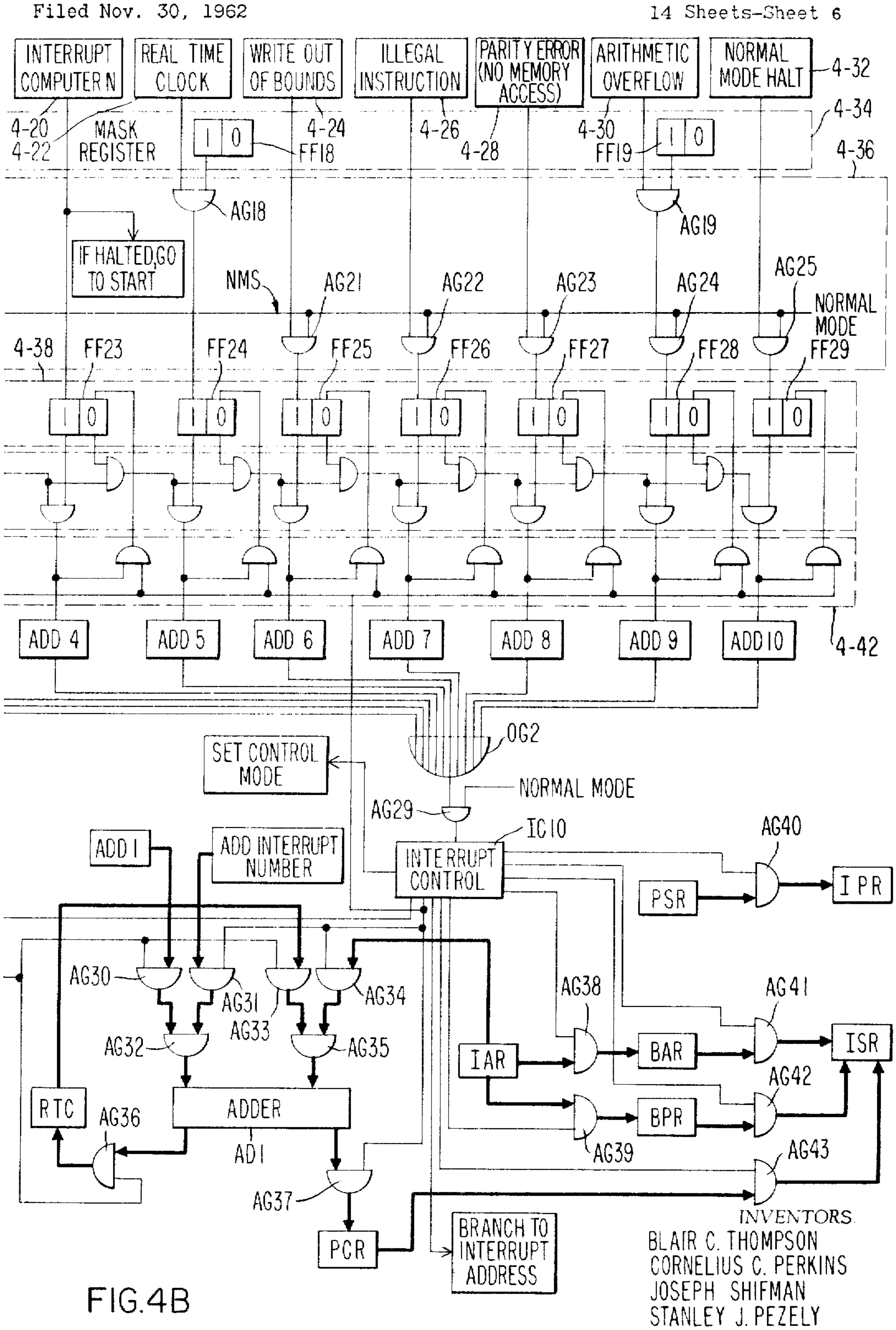

FIG. 4 comprises FIGS. 4A and 4B together presenting a logical diagram showing the detailed logical elements of the interrupt system.

Figure 5:
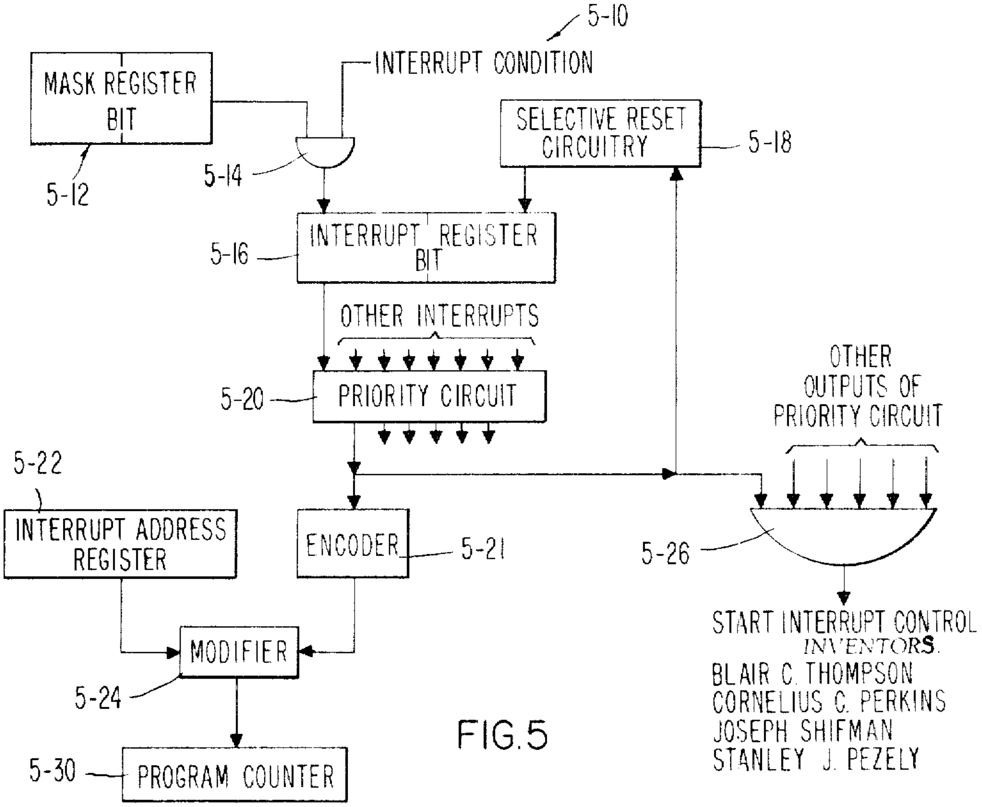

FIG. 5 is a block diagram of a typical individual interrupt register bits showing masked and unmasked interrupt signal flow paths in accomplishing an interrupt.

Figure 6:
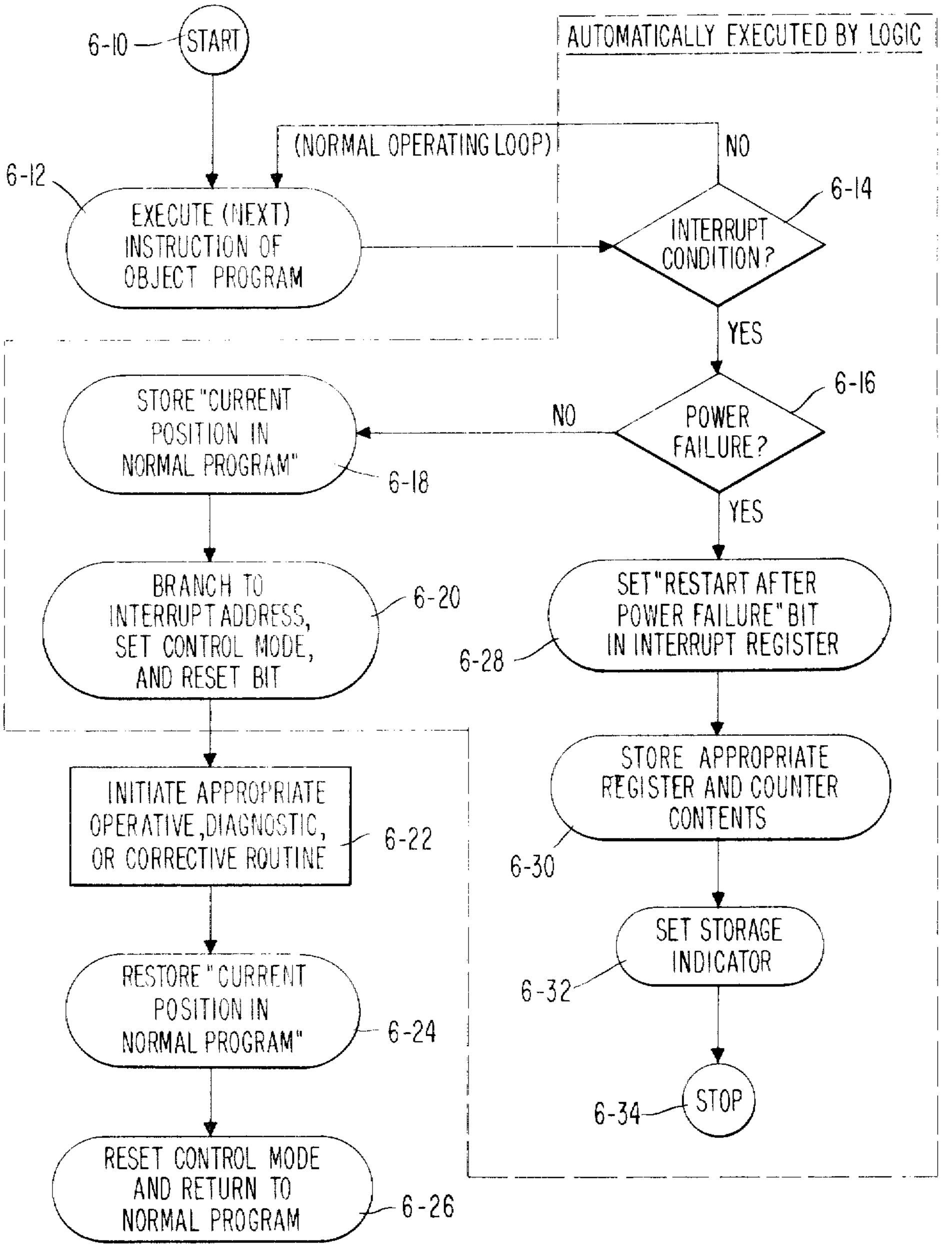

FIG. 6 is a flow path diagram illustrating computer processor operation during the handling of an interrupt condition.

Figure 7:
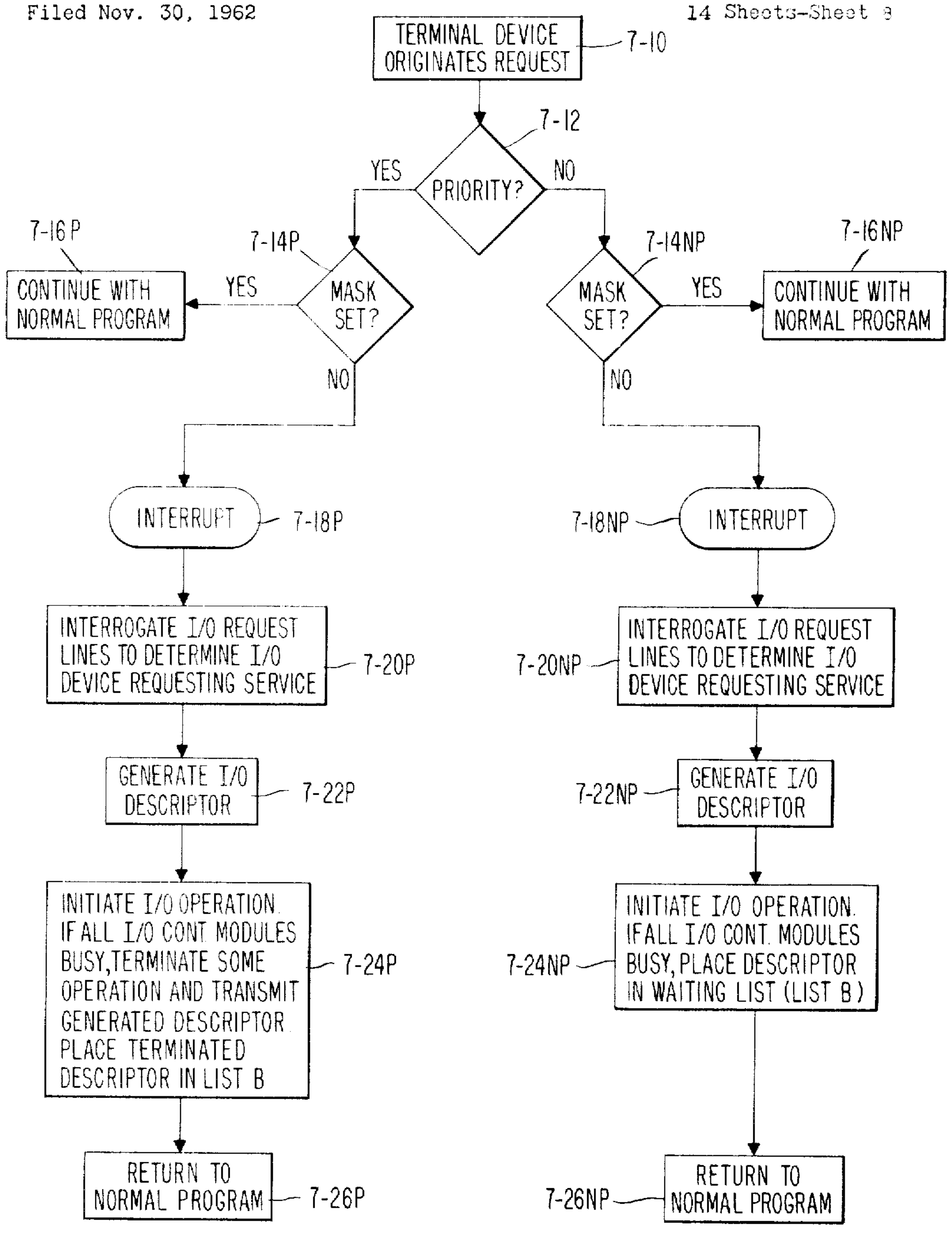

FIG. 7 is a flow path diagram illustrating computer processor operation during an input/output request interrupt.

Figure 8:
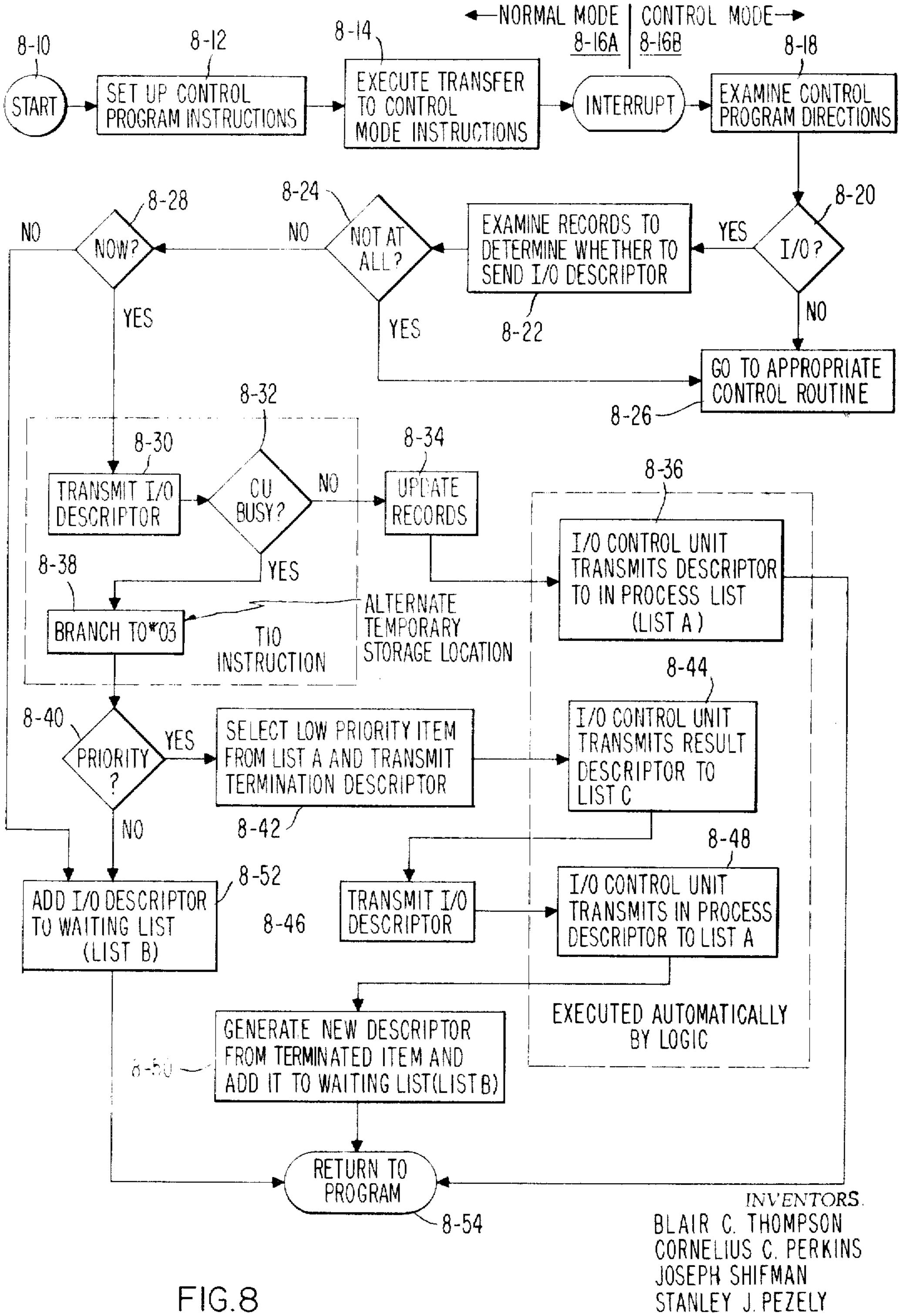

FIG. 8 is a logical diagram showing computer processor operation during the handling of an interrupt to cause the initiation of an input/output operation.

Figure 9A:
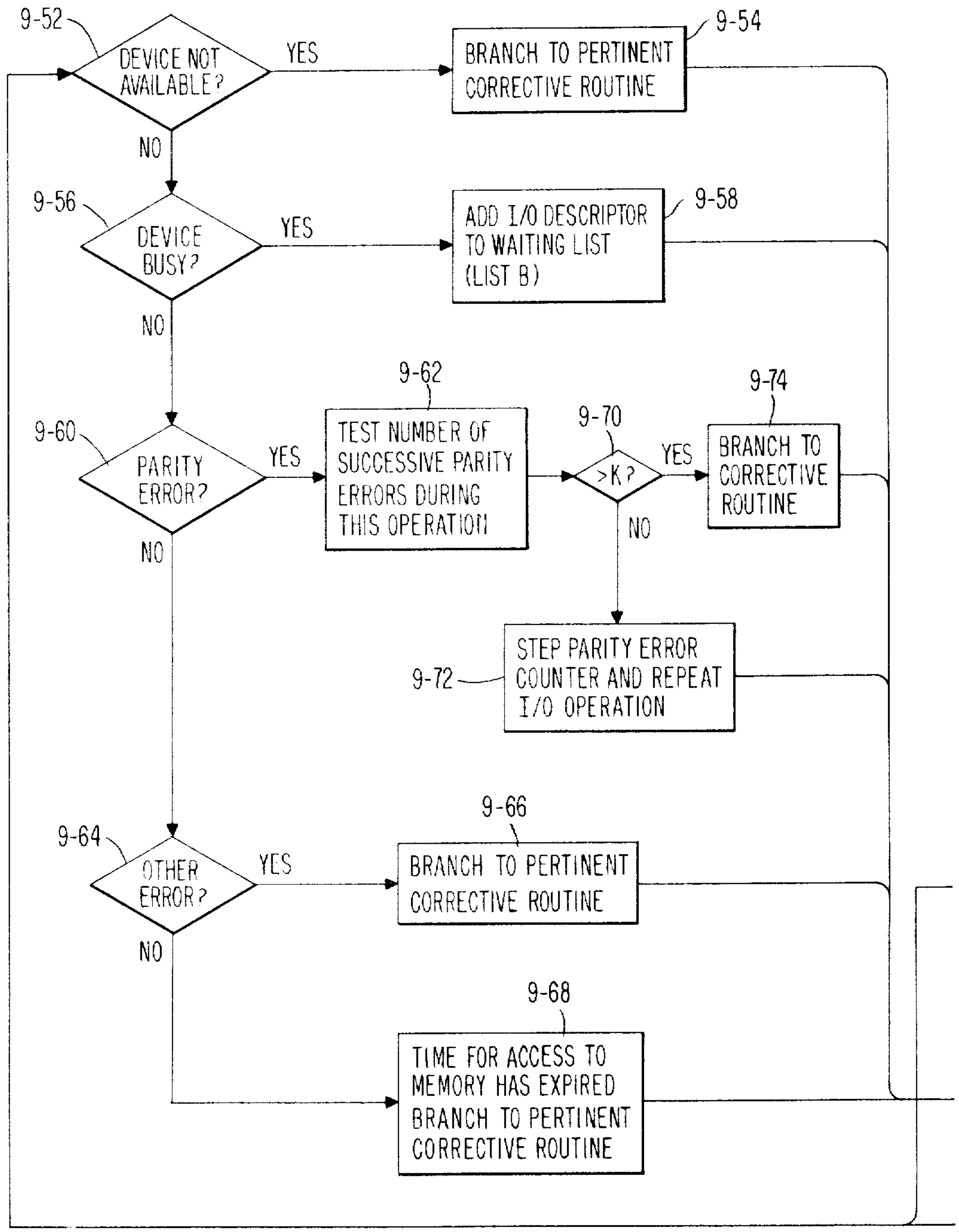
Figure 9:
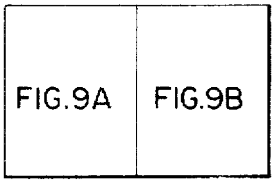
Figure 9B:
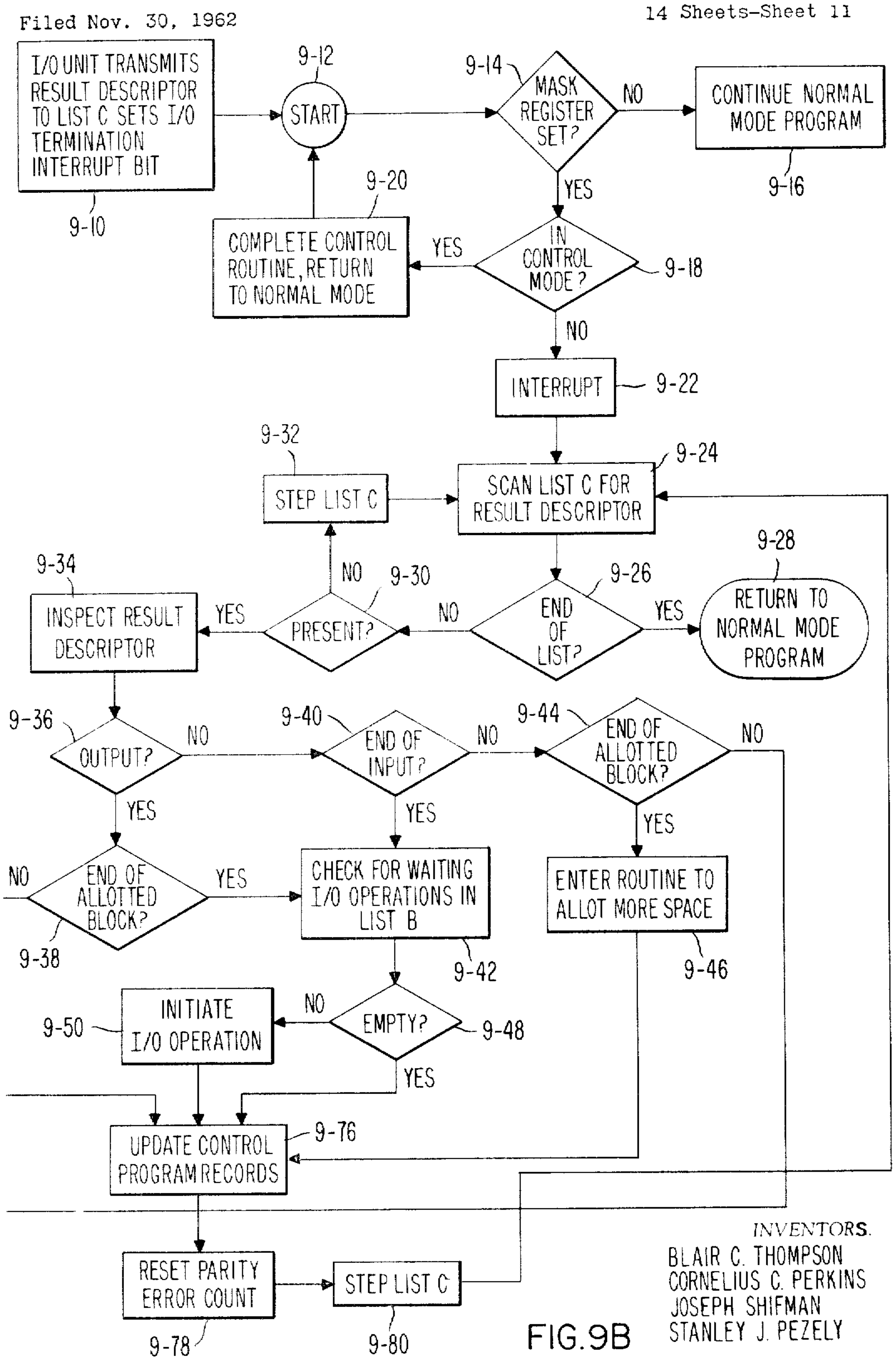

FIG. 9 is a composite of FIGS. 9A and 9B which constitute a logical flow path diagram of computer processor showing operation during the handling of an input/output termination interrupt.

Figure 10:
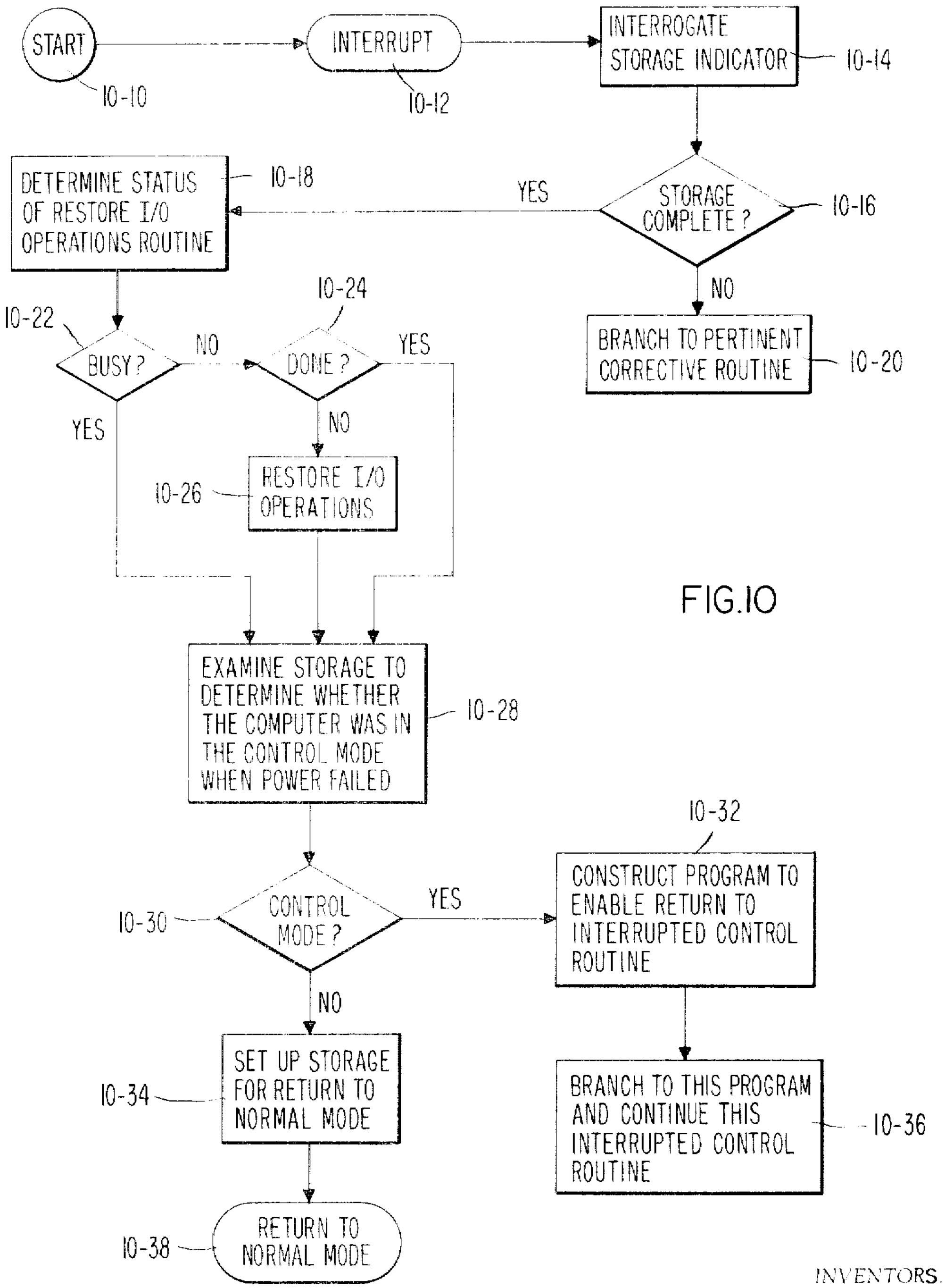

FIG. 10 is a logical flowpath diagram of computer processor showing operation during the handling of an automatic power restart following a power failure interrupt.

Figure 11A:
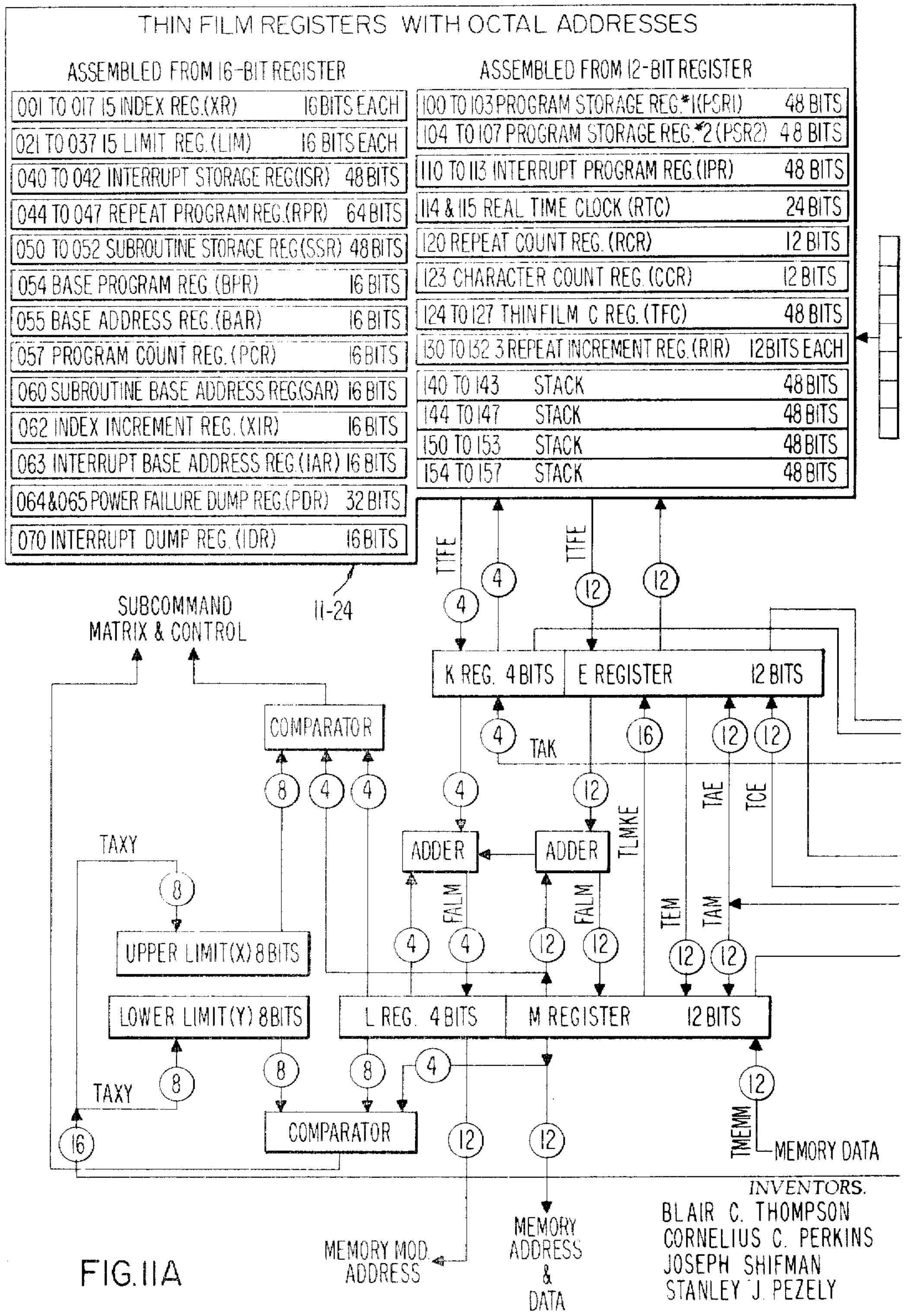
Figure 11B:
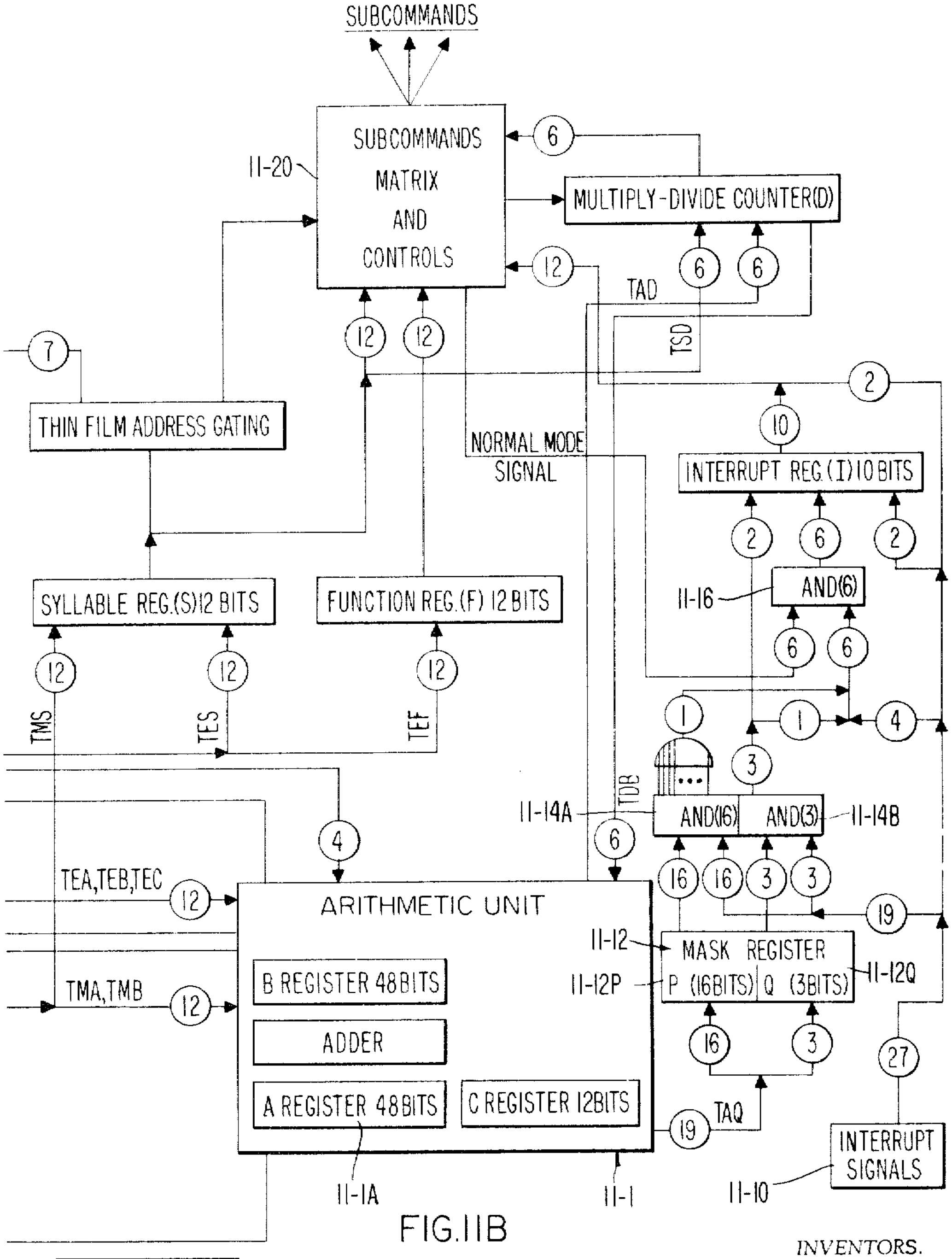
Figure 11:
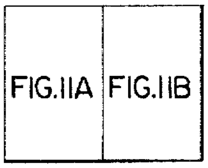

FIG. 11 is a composite of FIGS. 11A and 11B which constitute a block diagram of the entire computer processor showing the interrupt system in its related location.

In order to operate the present interrupt system effectively, certain instructions must be possible during the execution of the control program but not during the normal programs. One reason for this is to protect memory and input/output terminal equipment assigned to an operating program from being disturbed by an undebugged program. For example, only the control program has sufficient information available to adequately direct and assign input/output operations.

A study of various interrupt conditions will bring out the need for special instructions valid only in the Control Mode. These instructions are discussed below, describing the operation of the instructions. Some have alternate descriptions and the purpose of the instructions and why they cannot be valid in the normal mode will be discussed.

(1) *Load Mask Register.*—The control program must be able to alter the Mask Register of each computer selectively. The interrupt conditions processed by each computer may need to be changed depending on the urgency of the normal mode program to be executed. On the other hand, a normal mode program should not be allowed to adjust its Mask Register, since it does not have the scheduling information available, nor does it have the ability to interrupt another computer. Lacking this, a normal mode program could leave a system interrupt unprocessed or accessible for processing by more than one computer, either of which might cause trouble in the Control Program.

The following subsections (a), (b), and (c) are variations of the Load Mask Register instruction.

(*a*) *Interrupt Computer N.*—Because of a change in conditions, it may be necessary for one computer to signal another to re-examine its scheduling, etc. The control program being executed by the first computer would set up in memory (accessible to the control program of the second computer) sufficient data to indicate the reason for the interrupt, and then give this instruction. The control program of the second computer examines the appropriate memory locations and takes the proper action.

If this instruction were allowed in the normal mode, an undebugged program would cause a properly running program on a different computer to take improper action, which could ruin the data on this run. The memory bounds could prevent the first computer from setting up false instructions for the second computer, but even so, there is no need to allow the second computer to be interrupted in such a case. The only program with sufficient data to determine whether to interrupt a particular computer is the control program.

(*b*) *Load Memory Bounds.*—Protection of the control program and other normal mode programs in memory is essential during the debugging of a new normal mode program. The preferred mechanization is to use a three syllable instruction with the contents of memory locations (or stack) transferred into an upper and a lower bounds register. This instruction should not be needed by a normal mode program. If common subroutines are used, each program will have its own memory area for input data, variable instructions, and output data. Constants may be kept within the subroutine area and addressed relative to the base address register via index registers or transferred to the individual program's memory area mentioned above. This enables a subroutine to be used by more than one computer at any given interval of time. If the instruction is allowed in the normal mode, an undebugged program can disrupt other programs.

(*c*) *Return to Normal Mode—go to Control Mode.*—These instructions are needed to change back and forth between a normal program and the control program.

(2) *Transmit I/O Descriptor* (*TIO*).—In a multi-programmed computer, various terminal devices are reserved by the scheduling control program to certain programs. Some terminal equipment, such as a supervisory printer or a disc file, can be used by more than one program. If, for example, a tape unit is being used as the output of one program and if the TIO instruction can be given in the normal mode, there is nothing to stop an undebugged program from loading meaningless information on to that tape.

Another reason for having TIO only in the control mode is that there may be scheduling reasons for delaying the transmission of an input/output descriptor. For example, their corresponding mask bits 1 to 16 of Mask Register 12. There are two additional interrupt conditions I–1 and I–2 which require neither Mask nor Interrupt Register bits, as they are of highest priority as indicated by Priority Order and Type Table 16. A bit in the Interrupt Register 10 is reset only when the corresponding interrupt condition is processed by computer processor 18. Mask bits are assigned to the computers by a Load Special Register instruction (LSR) 14 of an executive control routine. These mask bits are provided in order that (a) local interrupt conditions can either be ignored or processed by the computer processor 18 in which they occur, and (b) system interrupt conditions can be assigned to any computer(s) in the system, depending on the work load and urgency of the request.

At the end of each instruction or completed iteration of a repeated instruction, the computer processor 18 is available to process an interrupt condition. If either of the two highest priority conditions I–1(Primary Power Failure) or I–2 (Increment Real Time Clock) exists, the higher one will be processed immediately. If neither of these top two conditions exists but some one of the 10 bits in the Interrupt Register 10 is set, the computer processor will process the existing interrupt condition having highest priority by shifting from its normal operating mode 18–1 to its control mode 18–2, provided it is not already processing one and consequently already operating in the control mode 18–2. The following table lists the interrupt conditions and their characteristics:

| Priority Order | Interrupt Condition | Interrupt Register Bit Number | Number of Mask Register Bits Required | Type | Mode in Which Recognized |
|---|---|---|---|---|---|
| 1 | Primary Power Failure | | 0 | System | Control or normal. |
| 2 | Increment RTC | | 0 | Local | Do. |
| 3 | Restart after Primary Power Failure | 1 | 0 | do | Normal. |
| 4 | 16 External Requests | 2 | 16 | System | Do. |
| 5 | I/O Termination | 3 | 1 | do | Do. |
| 6 | Interrupt Computer N | 4 | 0 | do | Do. |
| 7 | RTC Overflow | 5 | 1 | Local | Do. |
| 8 | Write Out of Bounds | 6 | 0 | do | Do. |
| 9 | Illegal Instruction | 7 | 0 | do | Do. |
| 10 | Internal Parity Error | 8 | 0 | do | Do. |
| 11 | Arithmetic Overflow | 9 | 1 | do | Do. |
| 12 | Normal Mode Halt Instr | 10 | 0 | do | Do. |

a high priority program may have been initiated, which is soon to require reading much information to be read in from a disc file, the scheduling routing may choose to delay another program's request for data from that disc file. The normal mode program cannot know this, because it does not have access to scheduling information.

The control program is the only program with the facility for maintaining records of which descriptor belongs to what program. The portion of the control program relating to Input/Output Terminations requires this information in order to update the scheduling records for the processing of various segments of programs.

(3) *Halt.*—A Halt instruction is only effective in the control mode, since the scheduling control program is the only program capable of determining whether a computer should be halted or not.

An interrupt system based on the criteria just given forms the content of the present disclosure which will now be described in detail with particular reference to the drawings.

Figure 1A:
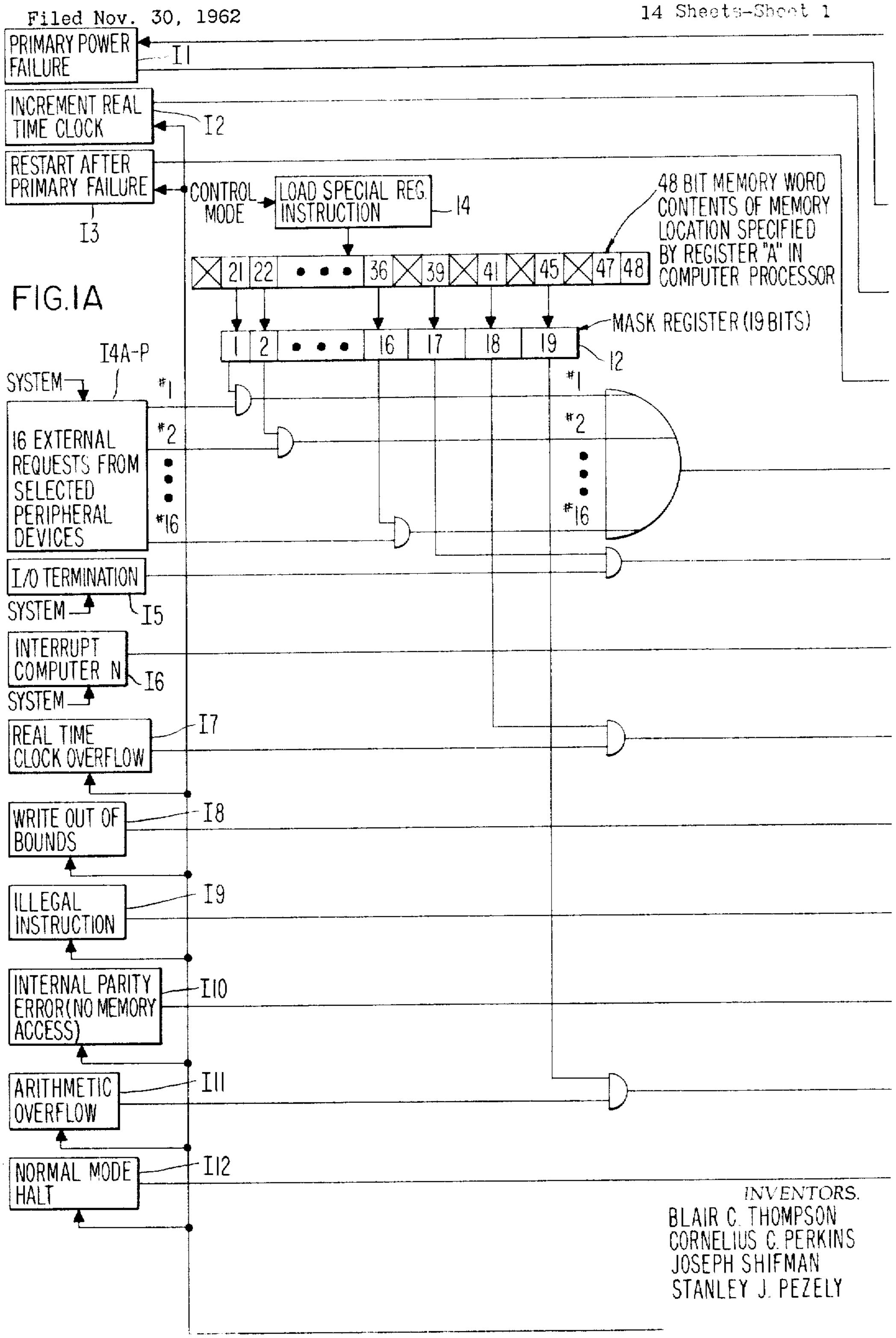
Figures 1, 1B:
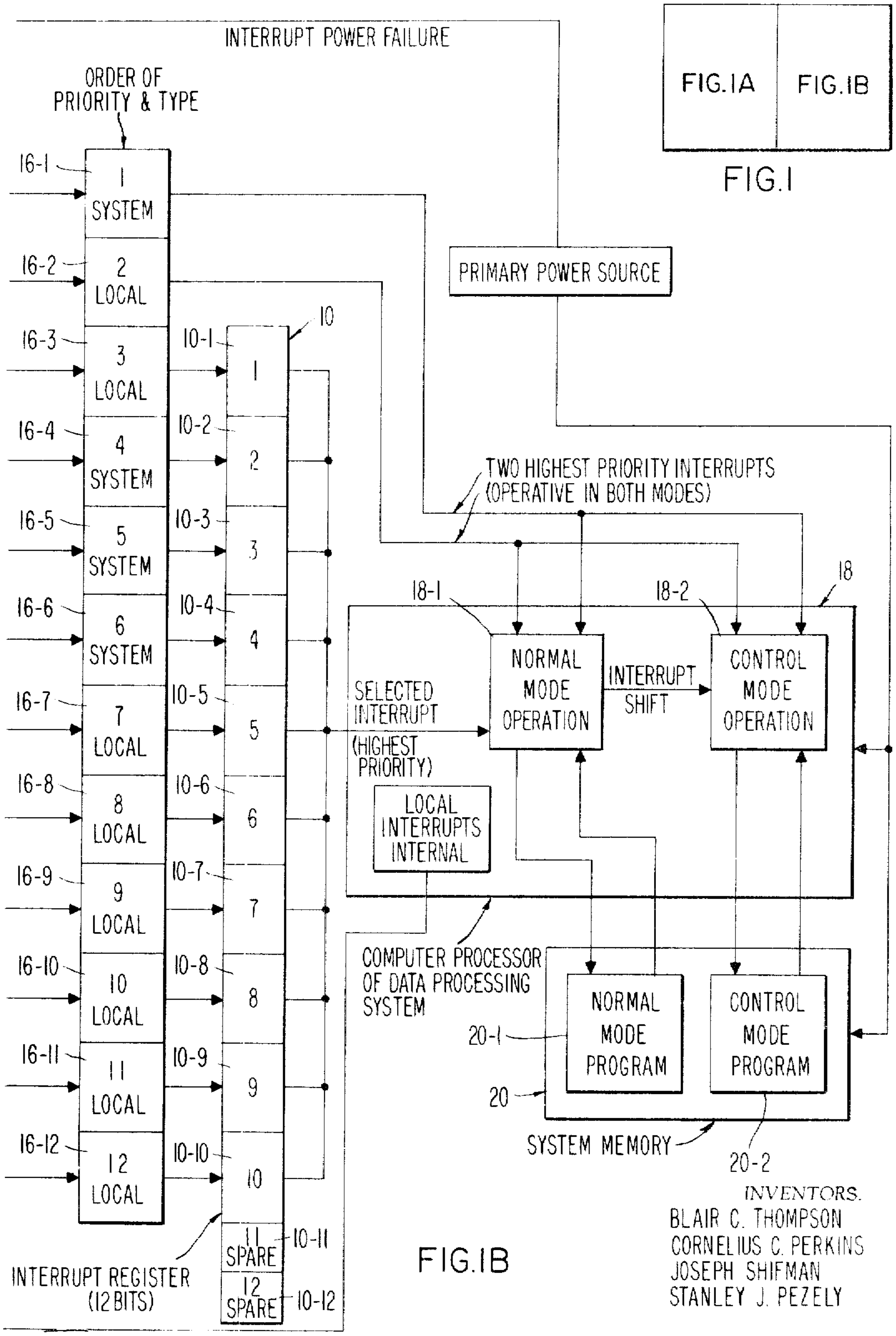

Referring now in particular to FIGURE 1, it is seen that each computer processor contains a 10-bit Interrupt Register 10, and a 19-bit Mask Register 12. Six of the bits of the Interrupt Register 10 (1, 4, 6, 7, 8, and 10) are set directly by the occurrence of its corresponding interrupt condition I–3, I–6, I–8, I–9, I–10, and I–12. Three other bits 3, 5, and 9 are set only if a corresponding bit of the Mask Register 12 is in the "1" state when its corresponding interrupt condition occurs. Bit 2 of Register 10 is set by any or all sixteen "External Request" interrupt conditions I–4A to I–4P in coincidence with The Mask Register 12 is loaded by means of the Load Special Register (LSR) instruction 14, which is available during control mode operation only, as follows:

Bits 21 through 36 of the memory location 48-bit word specified by register A (not shown) of the Computer Processor 18 are the mask for external request lines I–4A through I–4P, respectively.

Referring to the same 48-bit word, the following bits are associated with the indicated interrupt conditions.

Bit 39 is the mask for I/O Termination
Bit 41 is the mask for RTC Overflow
Bit 45 is the mask for Arithmetic overflow
Bits 47 and 48 are spares; all others are not used Note that any of the 16 External Request lines I–4A to I–4P that is "on" (1) will maintain its level until an Input/Output Control Module has serviced the external peripheral device requesting service. The operation of the Input/Output Control Module is covered in a separate, concurrent application entitled "A Data Processor Input/Output Control System," by H. Raymond Hallman, Leonard H. Sichel, Jr., Cornelius C. Perkins, and Stanley J. Pezely and assigned to the same assignee as the present application. The subject matter of that application is incorporated herein by reference for a complete description of the input/output control unit with which this invention operates.

A brief description of each of the interrupt conditions shown in FIG. 1 and listed above follows in the numerical order of their listed priority.

*I–1*—The Primary Power Failure interrupt condition occurs when the input A.C. voltage is detected out-of-tolerance. Storage circuits maintain D.C. supply voltages at normal levels for a period following failure detection; during this period the present instruction is repeated, and thereafter automatic storage of the information necessary for restart is placed in the Power Failure Dump Register.

*I-2*—The Real-Time Clock Count signal occurs once every 10 milliseconds and is used as a time reference.

*I-3*—The determination of whether a starting of the computer is a restart after Primary Failure is decided by the condition of bit 14 of the Power Failure Dump Register (PDR) which will be described later in this application. If it is a restart after power failure, the corresponding bit of the Interrupt Register 10 is set and control flip-flops, not shown, which are necessary for restarting the program after primary power failure, are automatically loaded with the contents of the PDR. The computer will return to the next instruction following the one during which primary power failure had occurred. If this return point is in the control mode operation of the computer processor 18, the interrupt presently being processed will be completed. Once normal mode operation of processor B is in effect, however, the Restart-After-Primary-Power-Failure interrupt condition will prevail, and interrupt processing will begin on the next instruction by shifting from Normal Mode 18–1 to Control Mode 18–2. The Control Program 20–2 stored in the system memory 20 is the only memory area utilized by the Processor Control Mode 18–2, while the Normal program 20–1 shown may be one of many normal programs associated with the Processor Normal Mode 18–1.

*I-4*—The sixteen External Request interrupts are signals to the computer(s) from the system peripheral devices (not shown). These request signals can be examined by the processor 18 during its control mode operation 18–1 by use of the Store External Requests (SER) instruction. Note that all Input/Output processing is handled by the Control Program 20–21 in order to centralize scheduling problems and to protect the system from the possibility of data destruction by conflicting normal mode programs.

*I-5*—An Input/Output Termination interruption for any reason whatever, is also a signal to the computer(s) from an I/O Control Unit. In this case the interruption is caused by a Result Descriptor being transmitted from the I/O Control Unit to the memory location specified by the contents of a register in the I/O Control Unit.

*I-6*—The Interrupt Computer "N" signal occurs as the direct result of a variation of the Load Special Register (LSR) instruction which is available in the control mode only.

*I-7*—Real-Time Clock overflow can occur after the Count Real-Time Clock interrupt condition is processed. The Real Time Clock (RTC) is loaded by the Load Thin Film (LTF) instruction.

*I-8*—The Write-Out-of-Bounds interrupt condition is a method of memory protection provided for normal mode operation. Its restrictions are: attempts to write into memory areas outside of the upper and lower memory bounds registers, and attempts to use the Load Thin Film (LTF) instruction to load the thin film Interrupt Address Register (IAR). The memory bounds registers are loaded during control mode operation by the LSR instruction.

*I-9*—An Illegal Instruction during normal mode operation is defined as use of a control mode instruction or of a non-existent operation code. In the control mode this interrupt condition applies to use of non-existent operation codes only. The instructions which will cause the computer to halt and are therefore forbidden in normal mode operation are Load Special Register (LSR), Transmit Input/Output Instruction (TIO), Interrupt Return (IRR), and Store External Request (SER).

*I-10*—Internal Parity is checked every time a data or program word is read from memory; the parity bit is appended to the word on each instance of memory write. If the error condition occurs during control mode operation, the computer will halt. The Interrupt Register bit corresponding to this interrupt condition is also utilized to indicate failure to gain access to memory. If two consecutive Count Real Time Clock (RTC) signals are received without servicing the first one, and if the memory request flip-flop is set indicating an attempt to gain access to memory, the no-access-to-memory interrupt condition has occurred.

*I-11*—The Arithmetic Overflow interrupt results from the following conditions:

(a) Fixed-point arithmetic overflow resulting from addition, subtraction, or division.

(b) Overflow resulting from the round instruction (TRM).

(c) Exponent overflow resulting from a floating-point arithmetic operation.

(d) Quotient overflow of more than one bit resulting from use of the Floating Divide (FDV) instruction with non-normalized operands.

The occurrence of any one of these four conditions will cause the Overflow Control flip-flop (POV) to be set (if the mask bit condition is not set) and remain set until the Branch on Condition (BRC) instruction is used. The Arithmetic Overflow interrupt bit will be set by the Overflow Condition during either mode of operation if the corresponding mask bit is set.

*I-12*—The Halt (HLT) instruction, employed in the normal mode 18–1, causes an interrupt condition 10–10 and consequent transfer to the control mode of operation 18–2. In the control mode 18–2, the Halt (HLT) instruction will halt the computer. The interrupt register bit corresponding to this interrupt condition is also utilized for another purpose: in indirect addressing, if the 18th least significant bit of any level of addressing after the first is a one, the interrupt register bit will be set. This capability available in both modes 18–1 and 18–2, is employed to facilitate computer lockout of certain areas of memory.

Figure 2:
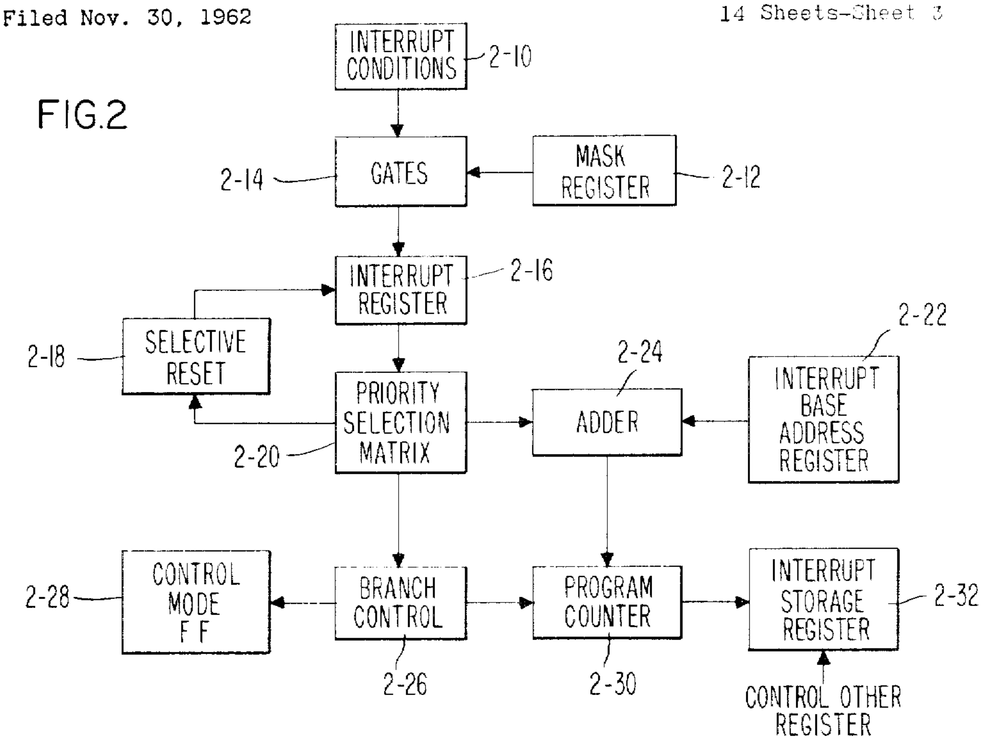
FIG. 2 is a block diagram showing the elements of the basic interrupt system involved to cause an operational mode shift in a computer processor.

Referring now to FIGURE 2, there is shown a block diagram containing the elements of the basic interrupt system which are involved to cause an operational mode shift in the computer processor. The plurality of interrupt conditions 2–10 and the contents of a Mask Register 2–12 are controlled by gate 2–14 which gate decides which of the interrupt conditions 2–10 are coupled into the interrupt register 2–16. A Priority Selection Matrix 2–20 decides which of the conditions contained in the Interrupt Register 2–16 has the highest priority. Based on this determination, the Priority Selection Matrix 2–20 will couple the selected interrupt condition to Branch Control Circuitry 2–26. The Priority Selection Matrix 2–20 will also return the Selective Reset Signal 2–18 to Interrupt Register 2–16 which will reset the condition which has just been selected. The Branch Control Circuitry couples the selected interrupt condition to two places. It causes the Control Mode flip-flop 2–28 to indicate a control mode condition. It also causes the Program Counter 2–30 to receive the selected interrupt condition. From the Priority Selection Matrix 2–20, is a priority number associated with each of the Interrupt Conditions of 2–10. This priority number will be coupled into an Adder 2–24 where it will be combined with the Interrupt Base Address from the Interrupt Address Register 2–22. The result of this addition by Adder 2–24 is sent to the Program 2–30 where it is combined with the selected signal from Branch Control Circuitry 2–26. Program counter 2–30 then indicates to the Interrupt Storage Register 2–32 the address as decided by the Program Counter 2–30 and the selected interrupt condition fed into the Program Counter from the Branch Control Circuitry 2–26.

Figure 3:
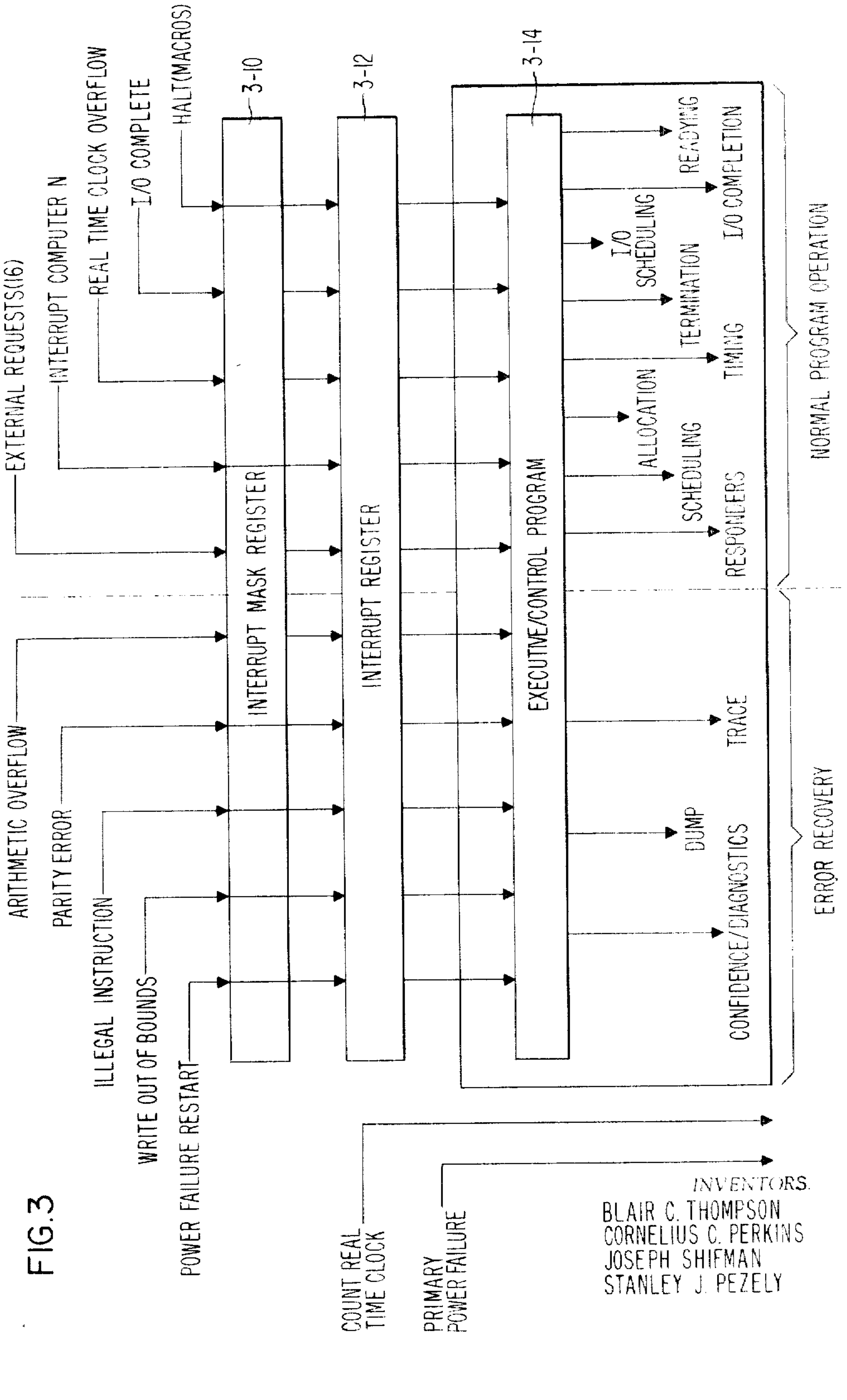
FIG. 3 is a block diagram showing the program areas affected by each of the masked interrupt signals.

FIGURE 3 illustrates the individual interrupt types showing the areas of a control or executive program 3–14 in which each of the particular interrupt types are effected. While it is shown that all ten types of interrupts are coupled through the Interrupt Mask Register 3–10, some of the ten types are directly coupled through the Interrupt Mask Register 3–10 into the Interrupt Register 3–12. The two separate types of interrupts at the bottom of the FIGURE 3, the Primary Power Failure Interrupt and the Count Real Time Clock interrupt are in no way associated with the Interrupt Mask Register 3–10 or the Interrupt Register 3–12, but are coupled directly into the control circuitry of the computer processing element. Those interrupt conditions having solid lines passing through Interrupt Mask Register 3–10 are interrupts which are not effected by the Interrupt Mask Register 3–10 but rather are coupled directly into the interrupt Register 3–12. Those interrupts not having direct lines through the Interrupt Mask Register 3–10 are interrupts which are controlled or "masked" out by the Interrupt Mask Register 3–10. It should also be noted that the External Requests interrupt contains 16 separate external request lines. However, all 16 external request signals occupy only one bit of the Interrupt Register 3–12. All 10 interrupt conditions coupled from the Interrupt Register 3–12 cause an operational shift of the computer processing element from its normal operating mode into an executive control operating mode. The executive control program 3–14 is shown broken into two general areas, the area above the dotted line associated with normal program operation, the area below the dotted line associated with error recovery. Each area has a number of portions. Those portions of the executive control program associated with normal program operation are the allocation, scheduling, termination, readying, timing, responding and completion of various operations within the program. Those portions associated with error recovery relate to diagnostic or confidence checking programs as well as the tracing of lost information or the dumping into storage of present register information for later reference. It is therefore seen from FIG. 3 that a large area of the present automatic interrupt system relates to normal program operation. Thus, while there is an area of the present automatic interrupt system which does relate to error recovery, the present interrupt system has a heavy concentration on control areas of an executive program which are no way related to error recovery.

Now refer to FIGURES 4A and 4B, a detailed logic diagram of the Automatic Interrupt System. In this representation the AND gates which are responsive to the heavy bar lines with arrows, such as the one associated with AND gate 44, represent a path of transmission which actually utilizes more detailed circuitry than is shown. Across the top of each figure are a plurality of blocks, each of which represents a separate type of interrupt signal presently included. Reading the signal blocks from left to right there is shown: Power Failure Interrupt 4–10, the Count Real Time clock interrupt 4–12, the Restart After Power Failure interrupt 4–14, the 4–16 External Request interrupts, 4–16A through 4–16P, the Input/Output Termination interrupt 4–18, the Interrupt Computer "N" interrupt 4–20, the Real Time Clock interrupt 4–22, the Write Out of Bounds Interrupt 4–24, the Illegal Instruction interrupt 4–26, the Internal Parity Error which includes the No Memory Access interrupt 4–28, Arithmetic Overflow 4–30, and the Normal Mode Halt interrupt 4–32. Directly below these interrupt conditions is the Mask Register 4–34 which includes all of the logic shown within the dashed lines. The Mask Register contains a group of 19 flip-flop circuits. Sixteen of these flip-flops FF1 through FF16 are associated with the 16 External Request interrupts. Flip-flop FF17 works in conjunction with the Input/Output Termination interrupt 4–18. The flip-flop FF18 is associated with the Real Time Clock interrupt 4–22. The flip-flop FF19 works with the Arithmetic Overflow 4–30 interrupt. Each of these flip-flops and its associated interrupt conditions are coupled to a group of 19 individual AND gates AG1 through AG19. These 19 AND gates are a portion of the interrupt register control which is shown in a dashed line block directly below the Mask Register 4–34. It is seen that a signal from any AND gate, 1 through 19, is only possible when both an interrupt condition and a ONE condition of each of the associated flip-flops, FF1 through FF19, of the Mask Register 4–34. The OR gate OG1 included in the phantom box containing the interrupt register control circuitry 4–36 is fed by all 16 AND gates AG1 through AG16. These signals represent all sixteen of the external request signals. Since any or all of these 16 signals will activate OR gate OG1, it is only necessary that we have a normal mode signal, NMS, at the AND gate AG20 in order to feed an output into the Interrupt Register 4–38. It should also be noted that all 16 of these external request signals activate only one flip-flop FF21 of the Interrupt Register 4–38. Five additional AND gates are included in the interrupt register control circuitry. They are AND gate AG21, AG22, AG23, AG24 and AG25. These five AND gates also are activated only in the presence of a formal mode signal, NMS together with their individual interrupt conditions. For example, the Write Out of Bounds interrupt condition 4–24 coupled into AND gate AG21 creates an output signal only in the presence of normal mode signal NMS.

Interrupt Register 4–38 is shown in a dashed line block below the interrupt register control circuitry 4–36. The Interrupt Register contains 10 individual flip-flops FF20, FF21, FF22, FF23, FF24, FF25, FF26, FF27, FF28 and FF29. Certain interrupt signals bypass the Mask Register 34 and are coupled directly into Interrupt Register 4–38. Consequently, the Mask Register 4–34 cannot be adjusted to block such a direct input signal. There are two interrupt conditions having such direct access to the Interrupt Register 4–38. They are the Interrupt Computer "N" 4–20 and the Restart After Power Failure interrupt 4–14. The restart After Power Failure interrupt is fed to flip-flop FF20 of the Interrupt Register while the Interrupt Computer "N" 4–20 is coupled directly into flip-flop FF23.

There are two interrupt conditions which bypass both the Mask Register 4–34 and the Interrupt Register 4–38. These are the interrupt conditions having the highest priority. They are the Power Failure 4–10 and the Count Real Time Clock 4–12. Power failure is the interrupt condition having the highest priority in the present system. This condition overrides all other interrupt conditions. The Count Real Time Clock interrupt condition 4–12 is second in order of priority and may be pre-empted only by Power Failure interrupt 4–10. The remaining interrupt conditions are all coupled either directly or indirectly through the Mask Register 4–34 into the Interrupt Register 4–38. The output of these remaining interrupt conditions are fed into a Priority Control circuit 4–40. Since each of these signals is associated with two AND gates, and since the action of each one of these flip-flop outputs is identical, only one will be described in detail herein.

Flip-flop FF21 of Interrupt Register 4–38 has a ONE and a ZERO output. The ONE output is coupled into AND gate AG26 of the Priority Control Circuit 4–40. The ZERO output of flip-flop FF21 is coupled into AND gate AG27. Both AND gates AG26 and AG27 have as a common signal the output of AND gate AG267 associated with a flip-flop FF20 directly to its left in the Interrupt Register. The Interrupt Register 4–38, as shown, includes the ten flip-flops reading from left to right in order of their priority. Thus, flip-flop FF20 has the highest priority within the Interrupt Register, while flip-flop FF29 has the lowest priority. It is only possible for the AND gates associated with the flip-flop FF21 to be activated when the flip-flop FF20 is in the reset condition having a zero output. For the moment, it is assumed that AND gates AG26 and AG27 have received their common signal and are only dependent upon whether the output of flip-flop FF21 is a one or a zero to determine whether AND gate AG26 or AND gate AG27 will indicate an output. If the output of flip-flop FF21 is a one, the AND gate AG26 will couple an output into AND gate AG28 and additional standard circuitry (shown generally for sake of simplicity) will add a two into OR gate OG2. The output of AND gate AG28 is returned to flip-flop FF21 to reset it to a zero output which is coupled into AND gate AG27. This zero signal, together with the common signal from AG267, will enable AND gate AG27 to feed a signal to the two AND gates associated with flip-flop FF22. The outputs of each of the ten flip-flops FF20 to FF29 will add a particular number, 1 through 10, associated with its left to right position in the Interrupt Register. Thus the register's highest priority flip-flop FF20 will add one. The number added will be increased to 10 in the case of flip-flop FF29 which has the lowest priority. The added number will be coupled through OR gate OG2 and into AND gate AG29. If a normal mode signal is also present at AND gate AG29, the interrupt control circuitry IC10 will receive the highest priority input to OR gate OG2. The interrupt control circuitry IC10 will be able to distinguish between each of the ten inputs to OR gate OG2 since a particular priority identifying number will be associated with each input. The interrupt control circuitry IC10 will therefore be able to branch to the particular interrupt address associated with the selected interrupt condition received by OR gate OG2. The AND gate AG28 is one of a plurality of AND gates included in the Selective Reset Circuitry 4–42. Each of the flip-flops of the interrupt register has a corresponding AND gate in this Selective Reset Circuit.

Inverters INV1 and INV2 associated with the Power Failure interrupt and the Real Time Clock interrupt, 4–10 and 4–12 respectively, are included in the Priority Control Circuit 4–40. It is the function of these inverters to insure that the Power Failure interrupt condition 4–10 associated with inverter INV1 will override and thereby pre-empt any of the lower priority circuits. The presence of a Power Failure signal into inverter INV1 will cause a low signal into AG48 insuring against an output. Likewise, a Count Real Time Clock interrupt signal fed into inverter INV2 will insure that AND gate AG49 will not be activated.

Activation of the interrupt control circuitry IC10 will cause a number of simultaneous events. Signals from the interrupt control circuitry IC10 will be coupled simultaneously into AND gates AG38, 39, 40, 41, 42 and 43. Activation of AND gates AG38 and AG39 allow the contents of the Interrupt Base Address Register containing 16 bits to be coupled to the Base Address Register (BAR) and the Base Program Register (BPR). At the same time, AND gate AG37 is activated by a signal of the Interrupt Control IC10 and feeds the contents of the Adder AD1 into the Program Count Register (PCR). A signal from interrupt control IC10 will activate AND gate AG40, allowing the contents of the program storage register PSR containing 48 bits to be fed into the Interrupt Program Register. The AND gates AG41, 42 and 43 will couple the respective contents of the BAR, the BPR, and the PCR registers into the 48 bit Interrupt Storage Register (ISR).

AND gates AG30, AG31 and AG32 are associated with Adder AD1 and enable it to receive one increment. This increment is either the addition of a one if AND gate AG30 received a signal by the Count Real Time Clock Control CRTC10, or the addition of the interrupt number if AND gate AG31 receives a signal from the Interrupt Control IC10.

AND gates AG33, 34, and 35 are associated with Adder AD1 to modify the Interrupt Base Address by the addition of the identification number associated with each particular interrupt.

Reference to FIGURE 5 will reveal that it follows the identical flowpath of FIGURE 2, however in the case of FIGURE 5, the flowpath represents individual bits within the registers. In addition, FIGURE 5 illustrates the masked and unmasked signals.

Refer now to FIGURE 6, which represents the operation of the computer in handling an interrupt condition. The blocks indicated within the dashed line include standard operations which are automatically executed by logical circuits. Thus, after operation has been initiated in this area enclosed by the dashed lines, a set of logical circuits will always operate in the same manner and conclude at the same point. A computer module is started by activation of the Start control 6–10. This will, in turn, execute the next instruction of the object program 6–12. At this point, the signal flow path will enter the enclosed area and 6–14 determines whether an interrupt condition exists or not. If it is not an interrupt condition, a loop will emanate from the top of the interrupt condition block 6–14 and return to 6–12 to cause execution of the next instruction of the object program through a normal operating loop. However, if 6–14 determines that an interrupt condition does exist, the next determination by 6–16 is whether or not a Power Failure exists. If it does, a Restart After Power Failure interrupt condition will be set in the Interrupt Register, a storing of appropriate register counter contents occurs as illustrated in 6–30. All information is stored which is necessary to recreate the program upon resumption of power as it existed at the time of the power failure. After the storage of this information, there is a setting of the storage indicator 6–32 which will, in turn, cause the A computer to Halt 6–34.

Return now to the determination of power failure 6–16. If the determination had been no, there would have been a storing of the current position in normal program 6–18 which would allow the computer to continue its normal operational mode at the conclusion of the present interrupt instruction. The signal path would branch to determine the interrupt address. The Control Mode flip-flop would be set and a reset bit is sent into the Interrupt Register bit location associated with this interrupt condition 6–20.

Branching of the signal path to obtain the interrupt address will cause a deviation from the path automatically executed by logic. Appropriate operative diagnostic or corrected routines are initiated 6–22.

At the conclusion of this initiation, the computer will restore its current position in the normal program 6–24. The control mode flip-flop will be reset for a return to the normal program 6–26. FIGURE 7 illustrates the flow path of a particular interrupt condition. It refers particularly to an Input/Output Termination interrupt condition. This interrupt condition will always be created by a Peripheral device which originates a service request 7–10. Next, its priority is determined 7–12. All references hereafter will have a suffix P if it pertains to a block having priority while the suffix NP will be used to indicate no priority. First, it will be assumed that the request does not have priority. Next, determine whether a mask has been set in this particular computer processor to block the satisfaction of this request 7–14NP. If the mask condition has been set, and this computer cannot satisfy this request, the computer will continue with its normal program 7–16NP. However, if the mask has not been set, an interrupt condition is created 7–18NP. The input/output request lines will then be interrogated to determine the input/output device requesting service 7–20NP. An input/output descriptor is then generated 7–22NP, and an input/output operation initiated; however, if all the input/output control modules are busy, the descriptor will be placed in a waiting list B, 7–24NP. Thereafter, the computer element will return to its normal program 7–26NP.

Returning now to the priority block 7–12, if at this point there has been determined that the device does in effect have priority, the determination again will be whether or not a mask has been set 7–14P. If a mask has been set, the computer element will continue with its normal program operation 7–16P. If, however, no mask condition has been set, an interrupt condition will occur 7–18P. Thereafter, the input/output request lines will be interrogated to determine which input/output device is requesting service 7–20P. There will then be an input/output descriptor generated 7–22P and an input/output operation initiated 7–24P. However, since there is a priority associated with the present interrupt, if all input/output control modules are busy, some lower priority operation must be terminated and this request satisfied. A transmit descriptor is then generated and the terminated descriptor is placed in a waiting list. Thereafter, as in the no-priority condition, the computer processor will return to its normal operation 7–26P.

Refer now to FIGURE 8. In the upper left hand corner, there is a Start operation 8–10. The setup control program instructions 8–12 indicate the initiation of computer operation for input/output operation. Following this, as has been noted, the computer will transfer to a control mode and receive instructions therein. Upon the execution of this transfer 8–14, an interrupt is caused which shifts the processor from its normal mode 8–16A to its control mode 8–16B. Once into its control mode, the processor will examine the control program directions 8–18 and determine whether or not an input/output operation is to be performed 8–20.

If the answer to this question is "yes," the processor will examine records contained in the memory 8–22 to determine whether to send an Input/Output instruction at all 8–24.

If the answer to this is "yes, do not send an instruction (descriptor)," it will go to another control routine 8–26. In the event that the processor is to send an input/output descriptor, the next question that is to be determined is whether or not it is to do so now 8–28. If the answer to this question is "yes," a Transmit Input/Output (TIO) instruction will be issued 8–30 by the computer processor. However, should the answer to this question be "later" rather than "now," an I/O Descriptor will be added to the "B" waiting list 8–52. Upon issuance of a TIO instruction, the next question asked is whether or not the Input/Output Control Module is busy 8–32. If all Input/Output Control Modules are busy, and the answer therefore to this question is "yes," the processor is given directions to branch to an alternate address location 8–38. It must now be determined whether or not this operation being sidetracked has any priority 8–40. If a priority does exist for this particular input/output operation, then a lower priority item will be selected from list A and a termination descriptor will be transmitted 8–42 to an IOCM having this lower priority. This IOCM will thereafter transmit a Result Descriptor 8–44 to a C location. The receipt of this Result Descriptor by the computer will cause the processor to transmit this higher priority Input/Output Descriptor 8–46 to the IOCM module whose operation has been pre-empted. This IOCM will in turn transmit an In Process Descriptor 8–48 which will be added to Location A associated with location C above. If no priority exists at 8–40, the Descriptor is added to the waiting list for execution when an IOCM is available, 8–52.

In referring again to the lower priority item that has been terminated 8–42, a new descriptor will be generated for this terminated item 8–50, and this new descriptor will be added to a waiting list B for later execution. Following the generation of this new descriptor the processor will return to its normal mode and renew the execution of the program which had been interrupted 8–54.

Refer next to FIGURES 9A and 9B. These figures refer to the signal flow path of one of the plurality of interrupts shown in FIGURES 4A and 4B. It refers specifically to an input/output termination interrupt. This is the interrupt condition associated with the input/output control modules and which indicates to the computer processor of the data processing system that an input/output operation has been terminated for some reason. It is initiated when an input/output unit transmits an operational result to the memory. This transmission causes the setting of an input/output termination interrupt bit in the Interrupt Register 9–10. A Start control 9–12 is activated by the presence of this interrupt bit. As is the case in the majority of instances in the present group of interrupts, the first question that must be resolved is whether or not the corresponding interrupt bit of the Mask Register 9–14 has been set. If it has, then the computer processor receiving such interrupt will ignore it and continue in its normal mode of operation 9–16. If, however, no corresponding mask bit has been set, the next decision is to whether or not the unit is in the control mode already 9–18. If it is, then the computer processor is directed to complete its present control routines and return to normal mode 9–20. Upon return to normal mode, the processor will remain in this mode until it is again activated by an input/output termination interrupt bit from 9–10 sent to the start control 9–12.

If the computer processor is not presently in the control mode, an interrupt condition is created 9–22, and the processor shifts to its control mode. The memory is then scanned step by step to discover the most recent input/output operational result 9–24. If the scanner is already at the end of the memory list 9–26, then there is a return to normal mode program by the computer processor 9–28. If, however, it has not arrived at the end of the list, the next question which must be decided is to whether or not the desired input/output result is present 9–30. If the result desired is not present, the memory list is stepped 9–32 and a rescanning of the memory list takes place 9–24. If however, the result desired is present, then there is an inspection of it 9–34. It must then be decided whether or not the operation just performed, as indicated by the result, was an output or input 9–36. If it was an input, the next question asked is whether or not it is an end of input, 9–40. If it is, the waiting list of input/output operations is checked 9–42. If the completed result was of an output operation 9–36, then the next question to be asked is whether or not it was an end of an alloted block, 9–38. If it was, the waiting list of input/output operations in the memory is rechecked 9–42. If the answer to the end of input question 9–40 was no, then the input is given an end of alloted block question 9–44. If it is an end of alloted block 9–44, then the machine will enter a routine to allot more space, 9–46 and the control program will be updated 9–76. However, if it is not the end of an alloted block 9–44, it must then be determined whether or not the peripheral device is available. The waiting list of input/output operations may be empty, 9–48. If it is, then the control program records are updated, 9–76. If, however, it is not empty, then an input/output operation is initiated. Following this initiation, the control program records are updated 9–76.

The updating of the control program records 9–76 will cause a resetting of the parity error count 9–78 which, in turn, causes the memory list containing the operational results to be stepped 9–80. The stepping of the memory list, 9–80 will cause another scanning of this memory list for the result descriptor 9–24.

If an output operation is involved 9–36, and the end of alloted block decision 9–38 indicates "no," there is another return to the device not available decision, 9–52, as in the case of the input operation where the end of alloted block has not been reached.

The question asked regarding the availability of the terminal device 9–52 is a negative one. That is, the question is whether or not the device is not available.

Thus, if the answer to this question is "yes," then the device is not available, and there is a branching to a pertinent corrective routine 9–54. After this branching the control program records are updated 9–76. If a double negative exists regarding the device availability, then this indicates that indeed the device is available. The available device is then asked whether or not it is busy 9–56. If it is, an input/output descriptor is added to a waiting list. The Control Program records are then updated 9–76.

If the answer to the Device Busy question 9–56 is "no" then the next determination is whether or not a parity error exists 9–60. If it does, then the number of successive parity errors made during this operation are accumulated 9–62. If the number accumulated is greater than some constant (K), there is a branching to a corrective routine 9–74. The Control Program record is then updated. However, if the number of successive parity errors 9–62 is not greater than the constant (K) 9–70, the parity error counter is stepped and the input/output operation is requested 9–72 before the Control Program are updated 9–76.

If no parity error is determined to exist, 9–60, the next interrogatory is whether or not any other error exists 9–64. If it does, then there will be a branching to a pertinent corrective routine 9–66 associated with this other error. The Control Program records are then updated 9–76. If no other error is present 9–64, but the time required for access to the memory has exceeded a limit, there is a branching to a pertinent corrective routine 9–68. The Control Program records are then updated 9–76.

It is seen by general reference to FIGS. 9*a* and 9*b* that a series of corrective routine branches which are pertinent to a particular problem each have separate locations within the program records. Thus the up-dating of the control program records 9–76 maintains a constant record of the condition of the device, whether or not the device is busy, whether or not a parity error exists, or whether or not any other error exists. If in fact each of these enumerated items are checked and it is seen that the control program record will maintain a constant source of present information concerning the input/output devices and their operation.

FIG. 10 shows the Restart After Power Failure Interrupt. It is another of the plurality of interrupt conditions shown in FIGS. 4*a* and 4*b*. While not all of the interrupt conditions are shown, the particular interrupts chosen to be illustrated in the drawings are considered to be those interrupt conditions which show a general logical signal flow path which is representative not only of all interrupt conditions included in the present configuration, but of many others which could be incorporated therein.

The Start control 10–10 will initiate the Restart After Power Failure Interrupt. This interrupt condition is associated with the restarting of various elements of the data processing system after the occurrence of a primary power failure. After the interruption 10–12 has occurred the storage indicator is interrogated 10–14 to determine whether or not the system has completed storage of all of the necessary register information to now resume processing at the point at which the primary power failure occurred 10–16. If it had not been able to get complete storage, then there is a branching to a pertinent corrective routine 10–20. However, if the storage was completed, the operative status of the routine in the control program "Restore I/O operations" is determined 10–18. If this routine is busy 10–22 then the storage contents are examined to determine whether the computer was in the control mode when primary power failed 10–28. However, if the "Restore Input/Output Operation" routine is not presently busy, the next determination is whether or not it has just completed an input/output operation. If it has, then the storage information is examined to determine whether the computer was in the control mode when power failed, 10–28. If however, the input/output operation was not just completed, then there will be a restoration of input/output operations 10–26. After which there is an examination of the storage information to determine the operational mode of the computer when its power failed.

If the computer processor was in the control mode when power failed, 10–30, then a program is constructed to enable the return of the computer processor to the interrupted control routine 10–32. When the program has been reconstructed the computer will branch to it and continue the execution of the interrupted control routine 10–36.

If the computer processor was not in the control mode when the power failure occurred 10–30, then storage will be set up for return to normal mode 10–34 and thereafter the computer will return to its normal mode 10–38.

Refer generally to FIGURES 11A and 11B, which together illustrate a block diagram of the entire computer processor. The automatic interrupt system is shown herein to present its relative location within the computer processor.

The overall processor is disclosed in a separate concurrent application entitled "Computer" by Lucile E. Mott, Ronald B. Lounsbury, Blair C. Thompson, S. Peter Beauregard, James L. Murtaugh, Jr., and August A. Sardinas, and is assigned to the same assignee as the present application. The subject matter of that application is incorporated herein by reference for a complete description of the entire computer processor within which this invention operates.

Brief reference will be made to other areas within the computer processor to better orient the operation of the present disclosure within its related environment.

Handling of the ten interrupt conditions recorded by the Interrupt Register involved transfer of the Computer Processor shown in FIGURES 11A and 11B to the control mode of operation, wherein an appropriate control routine will service the interrupt. Referring in particular to FIGS. 11A and 11B, the transfer process from normal mode to control mode is automated as follows; utilizing the octal addressed registers of the thin film memory 11–24.

(a) The contents of the Base Address Register (BAR) 055, Base Program Register (BPR) 054, and Program Control Register (PCR) 057 are stored in thin film Interrupt Storage Register (ISR) 040 to 042 in that order. Note that the stored contents of the PCR 057, always contains the address of the program word to be used on returning to normal mode operation. In other words, the overlap syllable has been lost, and the PCR corrected accordingly.

(b) The contents of the presently addressed Program Storage Register (PSR1 or PSR2) located at octal address 100 to 103 or 104 to 107, are stored in the thin-film Interrupt Program Register (IPR) 110 to 113. This is the PSR now containing the next syllable to be read if either PSR1 or PSR2 is filled.

(c) The contents of a number of control flip-flops are stored in the 16 bit thin film Interrupt Dump Register (IDR) 070. Numbering the bits from left to right, the IDR register 070 will contain:

*Bits*

1, 2, 3—The 3 bit address of the next 12 bit syllable of the Program Storage Register (PSR) syllable. This 12 bit syllable should be an operator syllable, since the transfer to control mode can occur only at the end of an instruction. The four PSR1 12 bit syllables are numbered, from the most significant end, 3–2–1–0, and the PSR2 syllables, 7–6–5–4.

4—A "one" if a repeated instruction was interrupted.

5—A "one" if a repeated instruction was interrupted before execution of the first iteration.

6–7—A "one" for each Program Storage Register (PSR), (if any) that is presently filled (bit 6 for PSR1 and bit 7 for PSR2). If the last syllable of PSR was used as the last syllable of the instruction before interrupt, then PSR is no longer filled; if the last syllable was not used, then PSR is filled. If a syllable has overlapped into PSR2, then PSR2 considered to be is filled, otherwise it is not. When these bits are restored to the "fill" flip-flops, if both of these are in the "one" state due to a syllable overlap, one of them will be reset since the overlap syllable has been lost.

8, 9, 10—The contents of the Overflow Control (POV), Underflow Control (PUN), and not normalized (PNN) flip-flops respectively.

11–12—The address of the top of the stack, numbered 0 through 3 (the contents of the stack counter).

13—A "one" if the computer was operating in the control mode when primary power failure was recognized.

14—A "one" if the interrupt condition is primary power failure.

15—A "one" for reversed counting of the stack counter.

16—Not used.

Bits 1 through 10 are the only ones of interest to the Control routine and consequently are the only ones whose corresponding flip-flops are restored as a result of the Interrupt Return (IRR) instruction.

The following table shows all possible combinations of the five bits 1, 2, 3, 6, and 7 of the Interrupt dump process.

| | Next PSR Syllable Address Bits | PSR1 Filled Bit | PSR2 Filled Bit | Restored flip-flops (overlap is lost) | |
|---|---|---|---|---|---|
| | | | | Bits | Bits |
| Case 1 Overlap | 1 2 3 | 6 | 7 | 1 2 3 | 67 |
| | 0 0 0 PSR1 is stored; | 1 | 1 | (same) | 10 |
| | 0 0 1 | 1 | 1 | | 10 |
| | 0 1 0 | 1 | 1 | | 10 |
| | 0 1 1 | 1 | 0 | | 10 |
| | 1 0 0 PSR2 is stored; | 1 | 1 | | 01 |
| | 1 0 1 | 1 | 1 | | 01 |
| | 1 1 0 | 1 | 1 | | 01 |
| | 1 1 1 | 0 | 1 | | 01= |
| Case 2 No Overlap | 0 0 0 PSR1 is stored; | 1 | 0 | (same) | |
| | 0 0 1 | 1 | 0 | | |
| | 0 1 0 | 1 | 0 | | |
| | 0 1 1 | 0 | 0 | PSR1 was stored even though already processed. | |
| | 1 0 0 PSR2 is stored; | 0 | 1 | | |
| | 1 0 1 | 0 | 1 | | |
| | 1 1 0 | 0 | 1 | | |
| | 1 1 1 | 0 | 0 | PSR2 was stored even though already processed. | |

(d) Next, the bit in the Interrupt Register 11–18 corresponding to the interrupt condition about to be processed is reset.

(e) A control mode flip-flop is set, thus marking transfer to the control mode, changing the interpretation of certain instructions and interrupt conditions and temporarily preventing the processing of other interrupt conditions that may occur, with the exception of the two highest priority interrupt conditions.

(f) The Base Address Register (BAR) 055 and Base Program Register (BPR) 054 are each loaded with the contents of the Interrupt Address Register (IAR) 063. Note that the contents of the Interrupt Address Register (IAR) can be altered only during control mode operation.

(g) The effective address is computed by adding the relative address associated with the specific interrupt condition signal 11–10 to be processed to the contents of the IAR. This new address is stored in the Program Count Register (PCR) 057. The contents of the memory location specified by this effective address will be one of a list of instructions, all unconditional transfers, to facilitate entry to the appropriate control routine.

(h) An Overflow (POV), Underflow (PUN), Not Normalized (PNN) and all other necessary control flip-flops (not shown) are reset to allow the control mode program to use them without first resetting them. In the event of Arithmetic Overflow interrupt, the servicing of the overflow is performed by the control mode program. The POV flip-flop is reset before it is stored, since the control mode program would, of necessity, have to reset the corresponding bit from which it is loaded on return to normal mode, in order to prevent a recycling of the interrupt loop.

The return transfer of the Computer Processor from its Control Mode to its Normal Mode is the responsibility of the Control Mode Program and is accomplished by an Interrupt Return instruction (IRR).

The two highest priority interrupts I–1 and I–2 of FIGURE 1, Primary Power Failure and Count the Real-Time Clock, respectively, are processed automatically, i.e., do not involve the Control Mode Program or its operation.

A Primary Power Failure interrupt causes all I/O operations to cease. Terminate Descriptors are sent to the memory locations specified by the contents of registers in the I/O Control Units. There is sufficient time, between detection of the condition and shut-down of the core memory, to accomplish this and to complete the execution of the present instruction or iteration of a repeated instruction. Once the execution of the instruction is completed, the contents of all control flip-flops necessary for restart are stored in the thin film (non-volatile) Power-Failure Dump Register (PDR) 064 and 065. The first sixteen bits of this 32 bit register are the same as those loaded into the Interrupt Dump Register (IDR), with bit 14 set and bit 13 set if the Primary Power Faiure Interrupt condition occurred during control mode operation. The next twelve bits are used to store the contents of the Interrupt Register (11–18), and the last four bits are blank.

The Increment Real Time Clock Interrupt occurs approximately every 10 milliseconds. This interrupt condition is processed by the hardware; it cannot upset the running of any program and can delay it only briefly. The processing is a matter of reading the contents of the Read Time Clock Register RTC 114 and 115 from thin film memory 11–24, incrementing it, writing it back into thin film memory, and setting a flip-flop to create the Real Time Clock Overflow interrupt condition bit if an overflow condition has occurred.

The "A" Register 11–1A within the Arithmetic Unit 11–1 is a 48-bit storage device, which contains the mask bits to be sent to the Mask Register 11–12.

There are a total of 19 bits that are transferred from the "A" Register 11–1A to the Mask Register 11–12 of these 16 bits represent the mask bits sent to the P register 11–12 that are associated with the sixteen external interrupt bits.

The Mask Register 11–12 is composed of nineteen flip-flops; sixteen are contained in the P register 11–12 and with the 16 External Request Interrupt Signals. The remaining three flip-flops contained in register 11–12Q are the Arithmetic Overflow Mask Interrupt, the Input/Output Termination Mask Interrupt, and the Real Time Clock Mask Interrupt.

The presence of any one of these interrupt bits corresponding to these nineteen flip-flops and emanating from the twenty-seven interrupt signals 11–10 will enable one of the 19 AND gates of 11–14A and B to pass a signal.

There are 16 AND gates included in the AND gate block 11–14A and 3 AND gates in block 11–14B.

The sixteen AND gates of 11–14A are associated with the 16-bit P mask register and the sixteen External Request Interrupt bits of the 27 bits of 11–10. When any one or all of the sixteen bits are present from both the Mask Register and External Request interrupt signals the OR gate 11–15 will give one output signal. This constitutes one signal of the six coupled into the six AND gates comprising AND gate block 11–16. The remaining five interrupt signals are the Arithmetic Overflow Signal, which is coupled from one of the three AND gates of 11–14B, the Write Out of Bounds Interrupt, the Illegal Instruction Interrupt, and the Parity Error Interrupt. Any of these six signals when combined with a Normal Mode Signal will create an interrupt bit within the Interrupt Register 11–18.

The output signals from the remaining two AND gates 11–14B are the Input/Output Termination, and the Real Time Clock Interrupt bits. These two signals go directly to the Interrupt Register 11–18 without any further gating.

There are four remaining interrupt signals of the total of 27 contained in the Interrupt Signal Block 11–10.

Two of these four have top priority and do not pass through the Interrupt Register 11–18. They are the Power Failure and the Count Real Time Interrupts. The last two are coupled through the Interrupt Register 11–18 but do so directly without any gating. These are the interrupt Computer N and the Power Restore after Primary Power Failure Interrupt signals.

While there has been shown, described, and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a data processor having a memory means and a processing means, said memory means containing a plurality of programs for execution by said processing means, the combination, comprising: an interrupt means coupled to and active upon said processing means, said interrupt means activated by a signal occurring upon the failure or momentary loss of primary power to said data processor, a storage means coupled to and activated by said interrupt means, said storage means further coupled to receive from said processing means, upon activation by said interrupt means, a sufficient portion of the program information presently being executed by said processing means to enable automatic program resumption from the point of interruption upon restoration of primary power to said data processor.

2. In a data processor having a memory means and a processing means, said memory means containing a plurality of types of programs, and said processing means having a plurality of types of operational modes, each of said modes associated with the execution of a particular type of said plurality of program types, the combination, comprising: an interrupt means capable of being activated by a signal occurring at the restoration, following a loss or failure, of primary power to said data processor, an operational mode shifting means coupled to and activated by said interrupt means, said mode shifting means coupled to and operating upon said processing means causing said processing means to shift from the execution of a first program type to a second of said plurality of types upon activation of said interrupt means by said restoration signal when said loss or failure of primary power occurred during the execution of said first program type by said processing means, and to cause said processing means to continue the execution of said second program type where said loss or failure of primary power occurred during the execution of said second program type.

3. An automatic interrupt system for controlling the operation of a multicomputing data processing system having a memory means and a plurality of processing means, said memory means containing a plurality of object programs and a plurality of control programs, each of said plurality of processing means including an interrupt means, means commonly connected to the interrupt means of all of said plurality of processing means to simultaneously supply thereto a plurality of system interrupt signals, each of said processing means further including an operational mode shifting means respectively connected to its interrupt means and a selective interrupt system control means connected to cause said processing means to be operationally shifted from the processing of one of said plurality of object programs to a selected one of said plurality of control programs upon recognition of one of said system interrupt signals and to inhibit the recognition of said interrupt signal by all others within said plurality of processing means.

4. The automatic interrupt system as set forth in claim 3 in which said interrupt means includes a plurality of storage portion means respectively connected to receive and store said plurality of interrupt signals which are comprised of local interrupt signals, associated with internal conditions within each of said data processing means and system interrupt signals, associated with conditions throughout said multicomputing data processing system.

5. The automatic interrupt system as set forth in claim 4 in which said plurality of interrupt signals and their associated plurality of storage portion means is comprised of means responsive to interrupt signals including signals corresponding to conditions associated with the input/output operation of said data processing system.

6. The automatic interrupt system as set forth in claim 5 wherein each of said plurality of processing means comprises an interrupt signal enabling means and an interrupt signal storage means each having a plurality of interrupt signal storage portions, and each of said interrupt storage portions having means to receive and store until used one of a plurality of interrupt signals associated with a particular operating condition of each of said data processing means and an operational mode shifting means coupled between said interrupt signal storage means and each of said processing means to cause a mode shift by said processing means upon the acceptance of one of said plurality of interrupt signals stored in said interrupt storage means.

7. The automatic interrupt system as set forth in claim 6 in which each of said locations of said interrupt storage means has associated with it an encoding means to add to the output signal of each location an identifying modifier such as to indicate to said mode shifting means the identification of the interrupt signal causing its activation.

8. The automatic interrupt system as set forth in claim 7 in which each of said plurality of interrupt signals is associated with particular program types of said plurality contained in said memory means enabling said mode shifting means upon the identification of said interrupt signal to cause the execution by the processing means of a program associated with said identified interrupt signal.

9. The automatic interrupt system as set forth in claim 8 in which said processing means includes means to automatically cause its return to normal operational mode upon completion of its assignment in the control operational mode.

10. A data processor with automatic interrupt capability having a memory means and a processing means, said memory means containing a plurality of types of programs, including at least a first and a second program type, said first type being termed the normal mode program and said second type being termed the control mode program, said processing means including a plurality of identical processing means each having at least two types of operational mode associated with the execution of a particular type of said plurality of program types, and correspondingly termed the normal and control mode, each of said plurality of processing means further having an interrupt means capable of being activated by a plurality of interrupt signals, an operational mode shifting means coupled to and activated by said interrupt means, said mode shifting means coupled to and operative upon said processing means to cause said processing means to shift from the execution of one of said types of programs to the execution of another type upon the occurrence of any of said plurality of interrupt signals, and to automatically cause its return to normal operational mode upon completion of its assignment in control mode, and each of said plurality of processing means also including means to cause inhibition by all others within said plurality from being activated by any of a plurality of interrupt signals and further means to enable its own inhibition by all others from said activation.

References Cited by the Examiner

UNITED STATES PATENTS

| | | | |
|---|---|---|---|
| 3,029,414 | 4/1962 | Schrimpf | 340—172.5 |
| 3,048,332 | 8/1962 | Brooks et al. | 235—157 |
| 3,061,192 | 10/1962 | Terzian | 235—157 |
| 3,079,589 | 2/1963 | Mol et al. | 340—172.5 |
| 3,135,946 | 6/1964 | Miller et al. | 340—147 |
| 3,152,320 | 10/1964 | Domenico et al. | 340—147 |
| 3,200,380 | 8/1965 | MacDonald et al. | 340—172.5 |
| 3,202,969 | 8/1965 | Dunwell et al. | 340—172.5 |
| 3,214,739 | 10/1965 | Gountanis et al. | 340—172.5 |
| 3,238,506 | 3/1966 | Jung et al. | 340—172.5 |

ROBERT C. BAILEY, *Primary Examiner.*

R. M. RICKERT, *Assistant Examiner.*